US011100597B2

(12) United States Patent
Sheppard et al.

(10) Patent No.: US 11,100,597 B2
(45) Date of Patent: *Aug. 24, 2021

(54) SYSTEMS AND METHODS FOR COMPUTING REAL-TIME COMMUNICATION MATRICES

(71) Applicant: Raymond J. Sheppard, North Palm Beach, FL (US)

(72) Inventors: Raymond J. Sheppard, North Palm Beach, FL (US); Alvin Daniel Ray, Plano, TX (US)

(73) Assignee: Raymond J. Sheppard, North Palm Beach, FL (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/372,221

(22) Filed: Apr. 1, 2019

(65) Prior Publication Data
US 2019/0228484 A1   Jul. 25, 2019

Related U.S. Application Data

(63) Continuation of application No. 15/456,498, filed on Mar. 11, 2017, now Pat. No. 10,282,798, which is a (Continued)

(51) Int. Cl.
*G06Q 30/02* (2012.01)
*G06Q 50/16* (2012.01)
(Continued)

(52) U.S. Cl.
CPC ............. *G06Q 50/16* (2013.01); *G01S 19/13* (2013.01); *G06Q 10/06* (2013.01); *G06Q 10/10* (2013.01);
(Continued)

(58) Field of Classification Search
CPC . G06Q 30/0207; G06Q 30/0214; G06Q 50/16
See application file for complete search history.

(56) References Cited

U.S. PATENT DOCUMENTS 10,154,020 B1 * 12/2018 Bolotin .............. G06Q 30/0214
2003/0083895 A1 * 5/2003 Wright ............... G06Q 30/0601
705/26.1
(Continued)

*Primary Examiner* — Azam A Ansari
(74) *Attorney, Agent, or Firm* — Marin Patents LLC; Gustavo Marin

(57) ABSTRACT

In some embodiments, a client driven referral management method may include: receiving the credentials of a member through a user device and a remote member through a user device; recording the consent of the member and the remote member to a referral fee agreement; associating a client with the member on the server when the client provides registration data to the server using a user device; recording real estate information browsing data and location data of the client with the user device of the client; assigning the remote member to the client, in which the remote member may be assigned by the server using the real estate information browsing data and location of client with the user device of the client; and notifying the member through a user device of the member of a real estate transaction involving the remote member and the client.

18 Claims, 20 Drawing Sheets

US 11,100,597 B2
Page 2

Related U.S. Application Data continuation-in-part of application No. PCT/IB2016/053071, filed on May 25, 2016.

(60) Provisional application No. 62/172,806, filed on Jun. 9, 2015.

(51) Int. Cl.

| | | |
|---|---|---|
| *H04W 4/029* | (2018.01) | |
| *G06Q 10/06* | (2012.01) | |
| *H04M 3/42* | (2006.01) | |
| *H04L 29/08* | (2006.01) | |
| *G06Q 10/10* | (2012.01) | |
| *G01S 19/13* | (2010.01) | |
| *H04L 12/58* | (2006.01) | |
| *H04W 4/02* | (2018.01) | |
| *H04M 3/51* | (2006.01) | |

(52) U.S. Cl.
CPC ......... *G06Q 30/0207* (2013.01); *H04L 51/04* (2013.01); *H04L 67/18* (2013.01); *H04L 67/22* (2013.01); *H04L 67/24* (2013.01); *H04L 67/26* (2013.01); *H04M 3/42* (2013.01); *H04W 4/02* (2013.01); *H04W 4/029* (2018.02); *H04M 3/51* (2013.01); *H04M 2203/6063* (2013.01)

(56) References Cited

U.S. PATENT DOCUMENTS

| | | | |
|---|---|---|---|
| 2004/0249705 A1* | 12/2004 | Spencer | G06Q 30/0269 705/14.46 |
| 2005/0273346 A1* | 12/2005 | Frost | G06Q 50/167 705/316 |
| 2012/0221390 A1* | 8/2012 | Codey | G06Q 30/0207 705/14.17 |
| 2014/0119531 A1* | 5/2014 | Tuchman | H04M 3/5166 379/265.09 |

* cited by examiner

| UNIQUE_ID VALUE 122 | LABEL 123 | TYPE 124 | U-LINK 125 | R-LINK 126 |
|---|---|---|---|---|
| 10001-5613051566 | SALLY SMITH | MEMBER | | |
| A159268357 | MARY HART | CLIENT | 10001-5613051566 | |
| G57384W884 | BILL COBB | CLIENT | A159268357 | 50607-7046651414 |
| 50607-7046651414 | TONY FINN | MEMBER | | |

*FIG. 20*

SYSTEMS AND METHODS FOR COMPUTING REAL-TIME COMMUNICATION MATRICES

CROSS-REFERENCE TO RELATED APPLICATIONS

This application claims the benefit of, and priority to U.S. patent application Ser. No. 15/456,498 entitled "COMPUTER IMPLEMENTED SYSTEMS AND PROCESSES FOR MANAGING COMPLEX RELATIONSHIP MATRIXES OF DATA" filed Mar. 11, 2017, which claims priority to International Patent Application No. PCT/IB2016/053071 entitled "CLIENT DRIVEN REFERRAL MANAGEMENT SYSTEM AND METHODS" filed May 25, 2016 which in turn claims priority to U.S. Provisional Application No. 62/172,806 entitled "Marketing System and Method of, Consumer-Driven Lead Generation and Incubation, For Real Estate Agents" filed on Jun. 9, 2015. Each application is incorporated by reference in its entirety.

BACKGROUND OF THE INVENTION

Field of the Art

This patent specification relates to computer systems involving the unique arrangement of data and relationship matrixes represented in-part by the data. This patent specification further relates to the field of the management of consumer or client driven referrals. More specifically, this patent specification relates to systems and methods that are configured to manage consumer or client driven real estate referrals and other real estate information.

Discussion of the State of the Art

The real estate industry is both lucrative and competitive. Realtors in general spend well over 50% of their time looking for leads, often investing hundreds and thousands of dollars monthly with direct mail and other marketing programs, personal websites, search engine optimization, etc. In 2014 the real estate industry spent over $13 billion in advertising and marketing. Real estate makes up about 17% of the U.S. economy. Often they will buy leads from companies such as Zillow®, Trulia®, and numerous $3^{rd}$ party providers of real estate leads spending anywhere from $50 to $1,000 monthly. Some of the top producing agents spend tens of thousands of dollars per month. Additionally, the quality of these leads, as expressed by the majority of users is generally poor and it's necessary to scrub hundreds to get a sale and finally the leads they get contain minimal information, typically a name and email address or phone number and at best a home address if the lead is from a homeowner considering the sale of their home.

The real estate industry has adopted best practices and specific processes for the payment of a referral fee from a referring realtor that has referred a client to another licensed real estate agent, whereby a referral fee is paid and dependent upon the successful completion of a real estate transaction. In order for payment of a referral fee to be lawful and enforceable it must comply with industry rules and regulations, state and federal laws, and contract law. Offer and acceptance are elements required for the formation of a legally binding contract: the expression of an offer to contract on certain terms by one person (the offeror) to another person (the "offeree"), and an indication by the offeree of its acceptance of those terms. The other elements traditionally required for a legally binding contract are (i) consideration and (ii) an intention to be legally bound. Offer and acceptance analysis is a traditional approach in contract law. The offer and acceptance formula, developed in the 19th century, identifies a moment of formation when the parties are of one mind. Unfortunately there does not exist a way to programmatically generate, assign, qualify, process, and confirm the acceptance of a referral fee in the residential real estate marketplace such that a legally bound agreement is in compliance with all industry regulations, state and federal laws.

Another industry problem is the response time to get back with potential buyers and sellers of real estate after they have made their inquiry. A 2014 WAV Group study details lead responsiveness results from a sample of 384 different brokers across 11 states. Researchers posed as consumers and inquired about listings on broker websites, Zillow.com, Realtor.com, and Trulia.com. The study revealed a staggering failure to serve the consumer as the study reveal that 48% of buyer inquiries received no response and where a response was followed up, the average response time with 15.29 hours. Finally, when consumers are asked about the one thing they would change about their traditional agent, they often respond with "faster response time from my agent". Establishing communication between potential buyers or clients and REALTORS® is an industry shortcoming that if addressed would benefit both clients and realtors.

Additionally while there are hundreds of real estate mobile applications with billion dollar organizations such as Zillow®, REALTOR.com®, and Redfin®, none are capable of programmatically opening to a specific hyper local market trends report and other reports specific to the neighborhood boundaries. None are capable of programmatically changing not only the geographic data but also automatically assigning a realtor who is assigned to receive inquiries based upon the geographic location of a user. Finally, none are capable of systematically and programmatically tracking a potential buyer or seller of real estate through the entire end to end process starting with the referring licensed real estate agent through all direct and indirect client opportunities to a licensed real estate agent who becomes the agent for the buyer.

The buying and selling of real estate is heavily regulated by federal and state agencies, with regulations varying from state to state. However, all fifty states require a valid real estate broker's license in order to share in any real estate sales commission. Real estate sales commission fees generally range from five to eight percent of the purchase price. The commission fee is usually split evenly between two real estate brokers when the buyer and seller are represented by different brokers. A broker is entitled to the entire commission fee when a broker represents both the buyer and the seller.

Referring leads or potential buyers and sellers from one real estate broker to another is a standard practice within the real estate industry. A 25% to 30% referral fee is typically paid to the referring real estate broker out of the commission that another broker earns from a transaction. The commission and any associated referral fee can be earned on the buyer "side", when the real estate broker closes a transaction while representing a buyer. Or the commission and referral fee can also be earned on the seller "side", when the real estate broker closes a transaction while representing a seller. If a real estate broker refers someone who both buys and sells, the broker will expect a referral fee on both sides.

Referral fees are typically paid without the buyers or sellers knowledge. Moreover, referral fees do not have to be disclosed or appear on any closing documents. A referral fee is essentially one real estate broker sharing his or her commission with another real estate broker. Note that receiving a referral fee is a regulated activity and a real estate broker cannot share his or her commission with anyone who does not have a valid real estate broker's license.

Over the years, the real estate industry has realized that real estate broker referral fees are an opportunity for them to collect revenue that would otherwise be lost. Likewise, real estate brokers welcome paying referral fees, because the referral is more cost effective than the marketing dollars a real estate broker would otherwise need to pay to generate new customers. In addition, referrals are more likely to close a transaction and generate revenue than general marketing leads. In fact, nationwide statistics suggest that a real estate broker is eight times more likely to help a referral client buy a home than a lead that just calls into the office. Thus, referrals, both the ability to collect them and the willingness to pay them, are widely embraced within the real estate industry and have become a standard practice that is essential to business success.

Therefore, a need exists for novel consumer or client driven referral management system and methods. A further need exists for novel systems and methods that are configured to track, record, and audit referrals for the payment of referral fees that satisfies the requirements of both state and federal law. A need also exists for novel systems and methods that are able to provide quick response time between a seller and buyer of real estate and their agents. Finally, a need exists for novel systems and methods that are configured to provide adaptive real estate information using the location of a user.

SUMMARY OF THE INVENTION

A client driven referral management system and methods are provided. In some embodiments, computer-implemented method for providing consumer driven referral management, may include the steps of: receiving the credentials of a member, such as a real estate agent, real estate broker, and the like, through a user device and the credentials of a remote member through a user device; recording on a server the consent of the member and the consent of the remote member to a referral fee agreement; associating a client with the member on the server when the client provides registration data to the server using a user device; recording real estate information browsing data and location data of the client with the user device of the client; assigning the remote member to the client, in which the second member may be assigned by the server using the real estate information browsing data and location of client with the user device of the client; and notifying the member through a user device of the member of a real estate transaction involving the remote member and the client.

According to another embodiment consistent with the principles of the invention, an alternative computer-implemented method for providing client driven referral management is provided. The method may include the steps of: receiving the credentials of a member through a user device and the credentials of a remote member through a user device; recording on a server the consent of the member and the consent of the remote member to a referral fee agreement; associating on the server a first client with the member when the first client provides registration data to the server using a user device; associating on the server a second client with the member and with the first client when the second client provides registration data to the server using a user device; recording real estate information browsing data and location data of client with the user device of the client; assigning the remote member to the second client, in which the remote member may be assigned by the server using the estate information browsing data and location of the second client with the user device of the second client; notifying the member through a user device of the member of the completion of a real estate transaction involving the remote member and the second client; and providing an incentive to the user device of the first client upon the completion of a real estate transaction involving the remote member and the second client.

According to embodiments consistent with the principles of the invention, the system and methods disclosed herein provide data storage and retrieval system for computer memory in communication with a processor, the processor and computer memory: receiving credentials of a first member and assigning a first member unique_ID value within a data store of the computer memory, the first member unique_ID value linked to a first geographic area for conducting real estate transactions, the first geographic area selected by the first member; receiving credentials of a remote member, the remote member having a selected second geographic area for conducting real estate transactions; receiving electronic consent from the remote member for a referral fee agreement and assigning a remote member unique_ID value to the remote member, linking the remote member unique_ID value with the second geographic area within a data store of the computer memory; receiving client information for a first client and assigning a first client unique_ID value in the data store of the computer memory; associating the first member unique_ID value with the first client unique_ID value in the data store forming a linked relationship between the first member unique_ID value and the first client unique_ID value; receiving an electronic request from the first client, the electronic request comprising location data useful to determine that the electronic request corresponds to a geographic area; determining that the geographic area is the second geographic area; determining an available remote member; attempting to establish communication between the first client and the remote member; and automatically generating a relationship matrix linking the first client unique_ID value, the first member unique_ID value, and the remote member unique_ID value upon authenticating communication between the first client and the remote member and storing the relationship matrix within the computer memory.

According to embodiments consistent with the principles of the invention, the system and methods disclosed herein solves the need for generating, assigning, qualifying, processing, and confirming, all in real-time, the acceptance of a referral fee in the residential real estate marketplace such that a legally bound agreement is in compliance with all industry regulations, state and federal laws. In some embodiments, system and methods enable the Service Provider to make an actual offer for a referral commission agreement when a remote member is offered the client vis a vis the transferring of the call, and when the remote member accepts the call, and therefore responsibility to include the Service Provider as a party to the closing of a real estate transaction and therefore entitlement to a commission, a legal and binding agreement may be generated. In further embodiments, the system may send both parties a message via a text and/or email message, confirming the acceptance and liability associated with the acceptance of the client and call after the call was completed. This terms of such as well as the amount of promised commission may be previously detailed in the original agreement signed by the Service Provider or its designee, as well as both the remote member and remote member's broker, the terms of which may be included in the agreement signed on the onset of the relationship formed when a member is enrolled in the system.

The clear majority of real estate agents throughout the U.S. have only one MLS membership and therefore their primary source of their commission income is within the MLS they are a member. According to embodiments consistent with the principles of the invention, the system and methods disclosed herein allows real estate agents to earn commission income from all MLS systems. Additionally, the system and methods provide a way for a real estate agent to generate new clients in markets where the real estate agent has no MLS membership. Furthermore, another unique aspect of the system and methods disclosed herein is the real estate agent new clients (direct and indirect) may be derived from the word of mouth efforts of the real estate agent's existing database. Assigning a unique identity upon registration and virtual tracking all client activities enables the system to track the origin of a client back to the referring member. The organizational structure for both the member and client would be impossible to track and manage without each being issued a unique identity immediately upon registration. When clients or indirect clients are traveling; the system determines the origin of the client or indirect client should they want to talk with a remote member, which is required for failsafe tracking and managing all client activities. Completing a communication from a client to a remote member without knowing the origin (referring member) of the client, makes it impossible to credit the referring member for a sale, should a sale take place, a problem which is solved by the system and methods disclosed herein. Also, when clients desire to use the system throughout the country, the system is configured to track the activity of the clients and to provide the remote member with data of the client's activity immediately after the remote member and client communication is establish the remote member may be sent a record of client's previous activities.

BRIEF DESCRIPTION OF THE DRAWING FIGURES

Some embodiments of the present invention are illustrated as an example and are not limited by the figures of the accompanying drawings, in which like references may indicate similar elements and in which:

FIG. 20 illustrates an example of a relationship data table which may be used to describe a relationship matrix according to various embodiments described herein.

DETAILED DESCRIPTION

Figure 1:
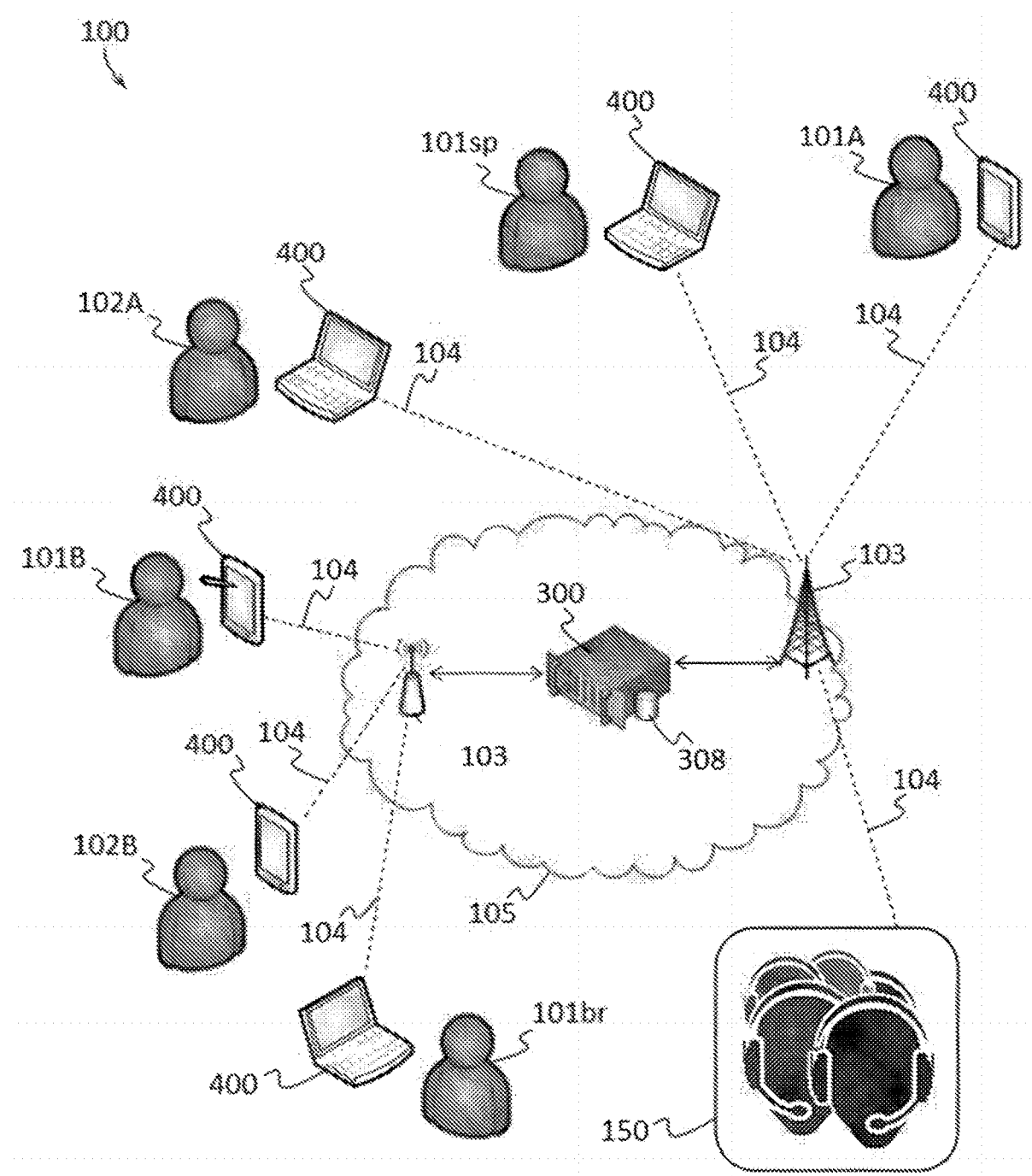
FIG. 1 depicts an illustrative example of some of the components and computer implemented methods which may be found in a client driven referral management system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer based on instructions received by computer software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "user device" or sometimes "electronic device" or just "device" as used herein is a type of computer generally operated by a person or user of the system. In some embodiments, a user device is a smartphone or computer configured to receive and transmit data to a server or other electronic device which may be operated locally or in the cloud. Non-limiting examples of user devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of user devices which are portable and easily carried by a person from one location to another may sometimes be referred to as a "mobile device" or "portable device". Some non-limiting examples of mobile devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as user devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, and/or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a user device through the internet (i.e., the database is in the cloud) or alternatively in some embodiments the database may be stored on the user device or remote computer itself (i.e., local storage). A "data store" as used herein may contain or comprise a database (i.e. information and data from a database may be recorded into a medium on a data store). In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

As used herein, the term "member" shall generally include a service provider member, a call center agent who is also a licensed real estate agent, a licensed real estate broker member, and a licensed independent real estate sales agent each of which members are licensed in the state(s) they are providing service and preferably as well, each maintains an active membership in the Multiple Listing Service(s) in the geographic area they are doing business. A "local member" as referenced herein may generally indicate this member made a referral to a client. A "remote member" as referenced herein may generally indicate this member received the referral and may have closed a real estate transaction for the client. Also as used herein a "service provider" member may generally refer to the one or more licensed real estate brokers which may be providing or maintaining the system.

As used herein, the term "chat bots" and "chatbots" shall generally include computer programs that mimic conversation with people using artificial intelligence. They can transform the way you interact with the internet from a series of self-initiated tasks to a quasi-conversation. Chatbots are designed to simulate conversations and or interact with clients and members. A chatbot (also known as a talkbot, chatterbot, Bot, chatterbox, Artificial Conversational Entity) is a computer program <https://en.wikipedia.org/wiki/Computer_program> which conducts a conversation <https://en.wikipedia.org/wiki/Conversation> via auditory or textual methods. Such programs are often designed to convincingly simulate how a human would behave as a conversational partner, thereby passing the Turing test <https://en.wikipedia.org/wiki/Turing_test>. Chatterbots are typically used in dialog systems <https://en.wikipedia.org/wiki/Dialog_system> for various practical purposes including customer service or information acquisition. Some chatterbots use sophisticated natural language processing <https://en.wikipedia.org/wiki/Natural_language_processing> systems, but many simpler systems scan for keywords within the input, then pull a reply with the most matching keywords, or the most similar wording pattern, from a database <https://en.wikipedia.org/wiki/Database>. The term "ChatterBot" was originally coined by Michael Mauldin <https://en.wikipedia.org/wiki/Michael_Loren_Mauldin> (creator of the first Verbot <https://en.wikipedia.org/wiki/Verbot>, Julia) in 1994 to describe these conversational programs. <https://en.wikipedia.org/wiki/Chatbot #cite_note-1> There are two main types of chatbots, one functions based on a set of rules, and the other more advanced version uses artificial intelligence <https://en.wikipedia.org/wiki/Artificial_intelligence>. The chatbots based on rules, tend to be limited in functionality, and are as smart as they are programmed to be. On the other end, a chatbot that uses artificial intelligence, understands language <https://en.wikipedia.org/wiki/Natural_language_understanding>, not just commands, and continuously gets smarter as it learns from conversations it has with people.

New consumer or client driven referral management system and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a client driven referral management system ("the system") 100 according to some embodiments is presented. The system 100 is configured to facilitate the transfer of data and information between one or more access points 103, user devices 400, and servers 300 over a data network 105. Each user device 400 may send data to and receive data from the servers 300 of a data network 105 optionally through a network connection 104 with an access point 103 and/or optionally directly with a server 300. A data store 308 accessible by the server 300 may contain one or more databases. The data may comprise any information that one or more users 101 desire to input into the system 100 including information on one or more users 101, information requested by one or more users 101, information supplied by one or more users 101, real estate information which includes any type of information which may be used to describe a geographic location, real estate property, and/or geographic area, and any other information which a user 101 may desire to input or enter into the system 100.

In this example, the system 100 comprises at least one user device 400 (but preferably more than two user devices 400) configured to be operated by one or more users 101, 102. User devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, user devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one user device 400 and/or server 300 programmed to perform one or more of the steps described herein. In preferred embodiments, more than one user device 400 and/or server 300 may be used, with each being programmed to carry out one or more steps of a method or process described herein.

In some embodiments, the system 100 may be configured to facilitate the communication of information between one or more users 101, 102, call centers 150, and servers 300 of the system 100. Users of the system 100 may include one or more selling users or members 101 which may be real estate agents, real estate brokers which may represent a real estate agent, or other entities which are licensed by the appropriate government agency to sell real estate properties. Additionally, a member 101 may include a service provider member 101*sp*, a call center agent who is also a licensed real estate agent, a licensed real estate broker member 101*br*, and a licensed independent real estate sales agent each of which members are licensed in the state(s) they are providing service and preferably as well, each maintains an active membership in the Multiple Listing Service(s) in the geographic area they are doing business.

The system may facilitate the communication of information for a first member 101A, a second member 101B, a third member 101C, a fourth member 101D, and/or any number of other members 101. Users of the system 100 may also include one or more prospective buying users or clients 102 which are interested in buying real estate property, selling their real estate property, and/or obtaining real estate information. The system may facilitate the communication of information for a first client 102A, a second client 102B, a third client, a fourth client, and/or any number of other clients 102. Call centers 150 may comprise a centralized office used for receiving or transmitting a large volume of requests by telephone, email, text message, and/or any other type of communication. Call centers 150 are enabled by one or more people functioning as agents to provide inbound and outbound communication by the call center 150.

As shown in FIG. 1, the system 100 may enable communication and the transfer of information between one or more users 101, 102, which may be remote or in a different location than one or more other users 101, 102. For example, a first client 102A may be local or in generally the same geographic area as a first member 101A so that the first client 102A and first member 101A may have developed a business relationship, such as by the first member 101A facilitated the purchase of a real estate property by the first client 102A. Since the first member 101A and first client 102A are known to each other, the first member 101A may enable the registration of the first client 102A into the system 100 and may therefore be considered as a referring member. When the first client 102A travels into a geographic area or in a different location that is a remote location, for example another state, county, zip code, or neighborhood, that is not an area that the first member 101A operates in, the system 100 may enable communication and the transfer of information between the first client 102A and a second remote member 101B who operates in the geographic area that the first client 102A is in.

For clarification purposes, the descriptors "local" or "referring" and "remote", when describing a member 101, are relative to the client 102 and that a member 101 of the system 100 may function as both a local or referring and remote member 101 for one or more clients 102. Also for clarification purposes, the descriptors "first", "second", "third", and the like, such as when used to describe a member 101 or a client 102, are used solely to denote that they are different entities.

Figure 2:
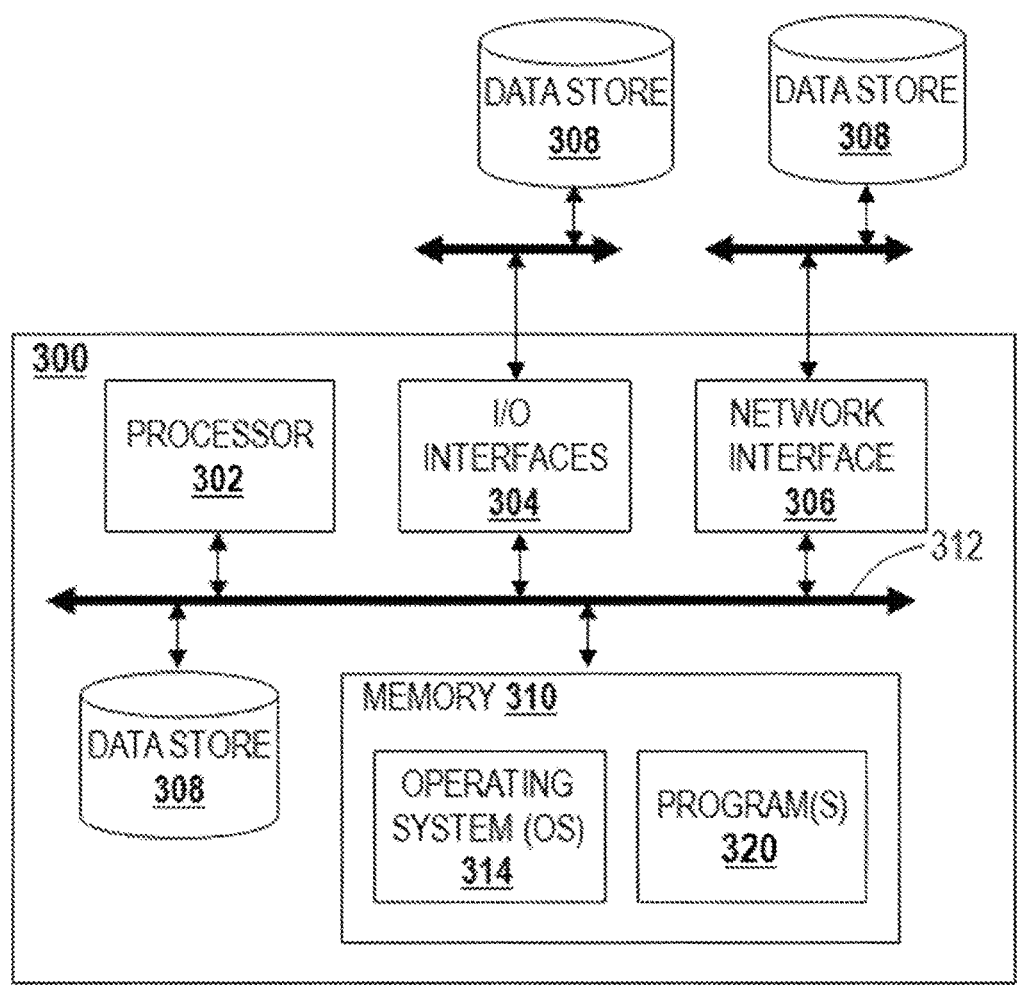
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 3:
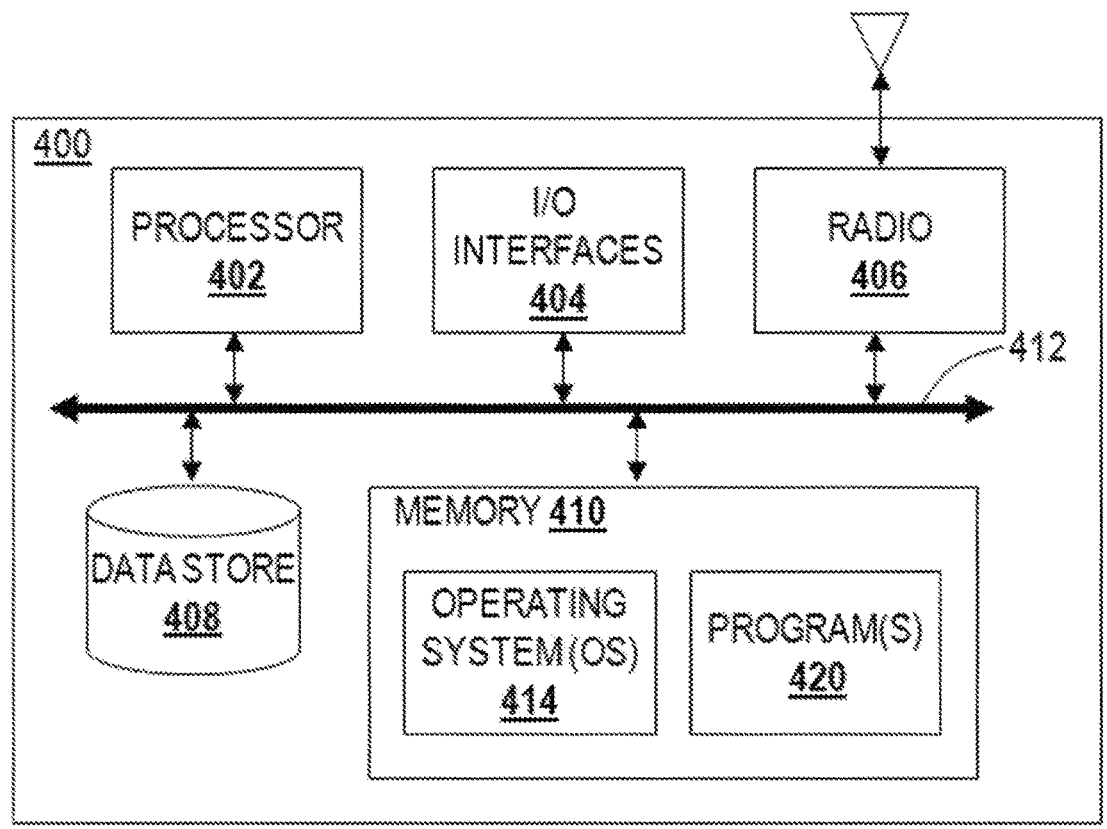
FIG. 3 shows a block diagram illustrating an example of a user device which may be used by the system as described in various embodiments herein.

Referring to FIG. 3, in an exemplary embodiment, a block diagram illustrates a user device 400 of which one or more may be used in the system 100 or the like. The user device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the user device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the user device 400, a semiconductor-based microprocessor (in the form of a microchip or chip set), or generally any device for executing software instructions. When the user device 400 is in operation, the processor 402 is configured to execute software stored within the memory 410, to communicate data to and from the memory 410, and to generally control operations of the user device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display device such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the user device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication 110 to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 420 may include various applications, add-ons, etc. configured to provide end user functionality with the user device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
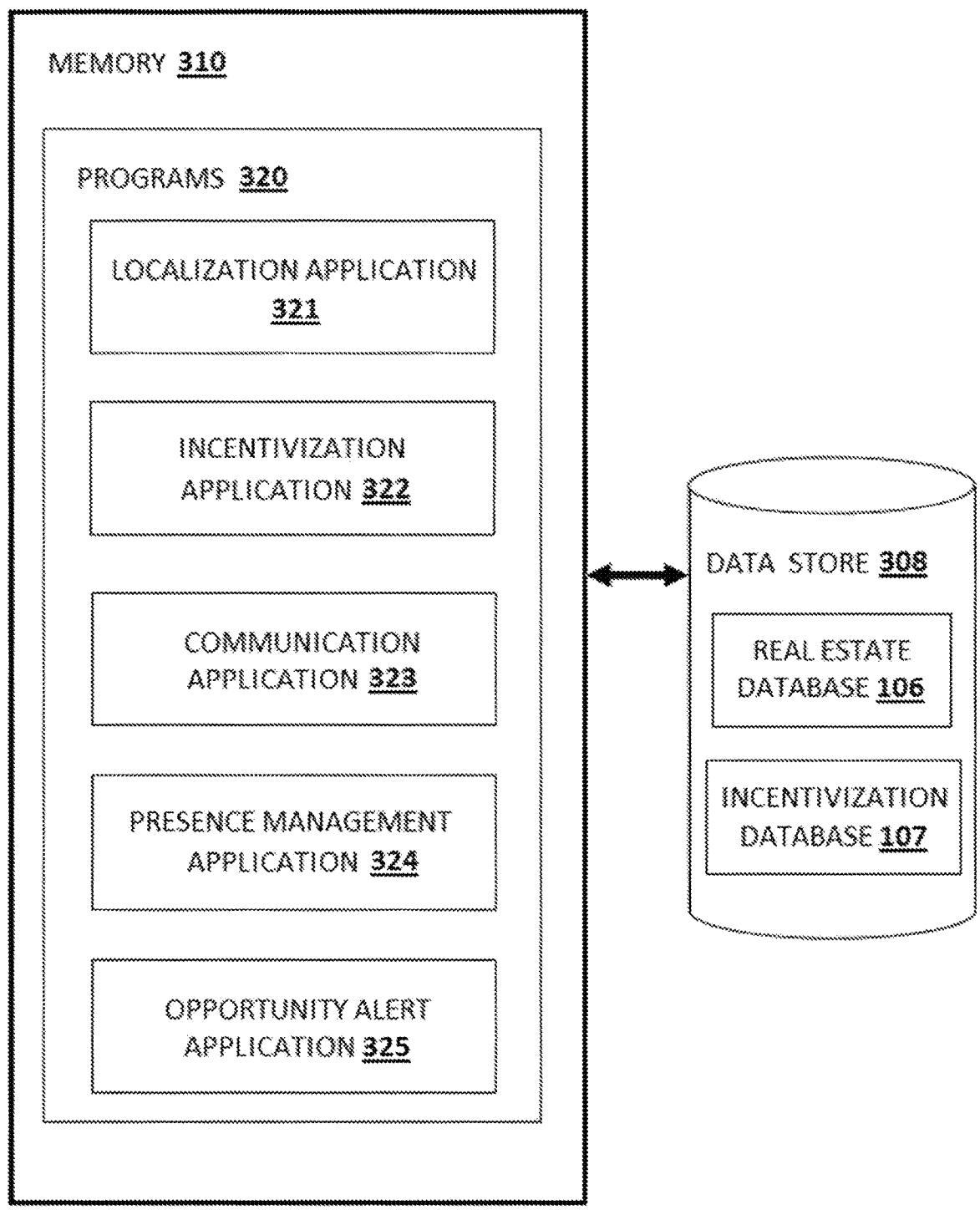
FIG. 4 depicts a block diagram illustrating some software applications of a client driven referral management system which may function as software rules engines according to various embodiments described herein.

FIG. 4 depicts a block diagram showing some software rules engines which may be found in a system 100 (FIG. 1) and which may optionally be configured to run on a server 300 (FIGS. 1 and 2) according to various embodiments described herein. In some embodiments, one or more servers 300 may be configured to run one or more software rules engines or programs such as a localization application 321, incentivization application 322, a communication application 323, a presence management application 324, and/or an opportunity alert application 325. In this embodiment, the engines 321, 322, 323, 324, 325, are configured to run on at least one server 300. The server 300 may be in electronic communication with a data store 308 comprising a database, such as a reconciliation database. The engines 321, 322, 323, 324, 325, may read, write, or otherwise access data in the database of the data store 308. Additionally, data may be sent and received to and from one or more user devices 400 (FIGS. 1 and 3) which may be in wired and/or wireless electronic communication with a server 300 through a network 105. In other embodiments, a localization application 321, incentivization application 322, a communication application 323, a presence management application 324, and/or an opportunity alert application 325 may be configured to run on a user device 400 and/or server 300 with data transferred to and from one or more servers 300 in communication with a data store 308 through a network 105. In still further embodiments, a server 300 or a user device 400 may be configured to run a localization application 321, incentivization application 322, a communication application 323, a presence management application 324, and/or an opportunity alert application 325.

In some embodiments, the system 100 may comprise one or more databases, such as a real estate database 106 (FIGS. 4-7, 12), incentivization database 107 (FIGS. 4, 6, and 7), and the like, stored on a data store 308 accessible to a localization application 321, incentivization application 322, a communication application 323, a presence management application 324, and/or an opportunity alert application 325. A real estate database 106 may comprise real estate information 506 (FIG. 5) which may include data and information on or describing one or more users 101, 102, of the system 100, other individuals which may be associated with real estate, and call centers 150. Information describing a member 101 may include data on the member 101A, 101B, such as contact information, contact photos, current business address, phone number, email address, preferences on types of real estate properties, geographic locations, and/or geographic areas that the member operates in and/or desires to operate in, areas or jurisdictions that the member is licensed in, Multiple Listing Services (MLS) that the member 101 is a member of, other members 101 and clients 102 that the member has worked with or associated with, and any other data which may be used to describe a member 101. Information describing a client 102 may include data on the client 102A, 102B, such as contact information, current residential or home address, phone number, email address, preferences on the types of real estate properties, geographic locations, and/or geographic areas that the client 102 desires live in or view, other members 101 and clients 102 that the client has worked with or associated with, and any other data which may be used to describe a client 102. Information describing a call center 150 may include data on the call center 150, such as contact information, preferences on the types of real estate properties, geographic locations, and/or geographic areas that the call center 150 desires to operate in, other members 101 and clients 102 that the call center 150 has worked with or associated with, and any other data which may be used to describe a call center 150.

In preferred embodiments, a real estate database 106 may comprise real estate information 506 (FIG. 5) which may describe one or more real estate properties, geographic locations, and/or geographic areas. Real estate information 506 (FIG. 5) which may describe one or more real estate properties, geographic locations, and/or geographic areas may be obtained from real estate property listings and other associated real estate data which be provided one or more third party property listing databases such as Multiple Listing Services (MLS's), Internet Data Exchange (IDX) property listings, and/or any other source of real estate information including For-Sale-By-Owner listings. Most property listing databases, such as MLS databases, contain not only residential listings but also other types of property listings including duplex listings, land listings, and commercial listings. Additionally, property listing databases, such as MLS databases, may contain basic property listing information which can include upwards of 100-150 different fields related to the property. In some embodiments, real estate listing information may be provided by widely used commercial listing databases such as LoopNet®. In further embodiments, real estate property listings may include apartment property listings. Information describing a real estate property may include data on the property such as the size, location, tax information, owner history information, sales information, proximity of the property to other real estate properties, geographic locations, and/or geographic areas, and any other data which may be used to describe a real estate property. Information describing a geographic location may include data on the location such as the tax information, owner history information, sales information, proximity of the geographic location to other real estate properties, geographic locations, and/or geographic areas, and any other data which may be used to describe a geographic. Information describing a geographic area may include data on the area such as the size, name of the area or neighborhood, buying power, population, income, cost index, gender, home or property values, tax information, owner history information, sales information, crime information, entertainment information, businesses and services in the area, schools in the area, available real estate properties in the area, public records, utilities, proximity of the geographic area to other real estate properties, geographic locations, and/or geographic areas, and any other data which may be used to describe a geographic area including the MLS that covers the geographic area.

An incentivization database 107 may include information which may describe one or more incentives. An incentive may comprise a digital award which may be accumulated and exchanged for a physical reward. For example, an incentive may comprise points, tokens, bitcoins and the like, which may be accumulated by a user 101, 102, upon completion of actions or tasks performed by a user 101, 102, which may be exchanged or redeemed for goods, services, rebates, discounts, and the like. Information describing incentives may include data on an incentive such as the amount of incentives an accumulated by a user 101, 102, how incentives are distributed, which goods, services, rebates, discounts, and the like that the incentives may be exchanged or redeemed for, and any other data which may be used to describe an incentive.

The localization application 321 may be configured to receive location information from a user device 400 and use the location information to determine which real estate properties, geographic locations, and/or geographic areas that the user device 400 is in or proximate too. Location information may include global positioning data, such as provided by a GPS sensor or radio I/O interface 404 of a user device 400, and/or network based positioning data, such as provided by the radio 406 of a user device 400 or by an access point 103 that the user device 400 is in communication with. In further embodiments, location information may be manually entered into a user device 400 or server 300 by a user 101, 102.

The localization application 321 may also be configured to provide real estate information which may describe one or more real estate properties, geographic locations, and/or geographic areas. In preferred embodiments, the localization application 321 may be configured to provide real estate information to a user device 400 which may describe one or more real estate properties, geographic locations, and/or geographic areas that the user device 400 is in or proximate to.

The localization application 321 may also be configured to receive information which may describe one or more real estate properties, geographic locations, geographic areas, members 101, clients 102, and/or call centers 150 which may be provided by one or more users 101, 102, and call centers 150.

The incentivization application 322 may be configured to record and provide information which may describe one or more incentives. Additionally, when a client 102 completes an incentivized activity using a user device 400, the incentivization application 322 may provide an incentive to the client 400, such as to or through the user device 400 of the client 102, as a reward or a rebate for completing or performing the incentivized activity. In some embodiments, an incentivized activity may include: registration by a user 101, 102, into the system 100; registration by a second user 101, 102, into the system 100 using information provided by a first user 101, 102, sometimes called a referral registration; completion of a real estate transaction by a user 101, 102, that another user 101, 102, referred; completion of a real estate transaction by a client 102 facilitated by a member 101; or any other activity which may be recorded by the system 100.

The incentivization application 322 may also be configured to enable the redemption of incentives for goods, services, rebates, discounts, and the like. For example, once a user 101, 102, accumulates a number of incentives, such as points, the incentivization application 322 may convert the incentives to a reward, such as a coupon or voucher or a bitcoin, which may be used by the user 101, 102, for discounted or complementary goods and services.

The communication application 323 may be configured to enable electronic communication between one or more user devices 400, servers 300, and call centers 150. Additionally, the communication application 323 may be configured to retrieve data and information from one or more third party data sources such as MLS or other property databases, websites, and the like, through a network 105. For example, the communication application 323 may be configured to provide or retrieve real estate information on one or more real estate properties, geographic locations, and/or geographic areas from one or more of the MLSs. The communication application 323 may further be configured to send, retrieve, store, modify, create, and delete data and information to and from a real estate database 106 and an incentivization database 107.

The communication application 323 may also be configured to govern electronic communication between severs 300, third party databases, call centers 150, and user devices 400. Data from severs 300, third party databases, call centers 150, and user devices 400 may be received by the communication application 323 which may then electronically communicate the data to the localization application 321, incentivization application 322, opportunity alert application 325, and database 106. Likewise, data from the localization application 321, incentivization application 322, opportunity alert application 325, and database 106 may be received by the communication application 323 which may then electronically communicate the data to severs 300, third party databases, call centers 150, and user devices 400. In some embodiments, the communication application 323 may govern the electronic communication by initiating, maintaining, reestablishing, and terminating electronic communication between the server 300 and one or more third party databases, call centers 150, user devices 400, and other servers 300. In further embodiments, the communication application 323 may control the network interface 306 (FIG. 2) of the server 300 to send and receive data to and from one or more third party databases, user devices 400, call centers 150, and other servers 300 through a network connection 104 (FIG. 1) over a network 105 (FIG. 1).

Figure 19:
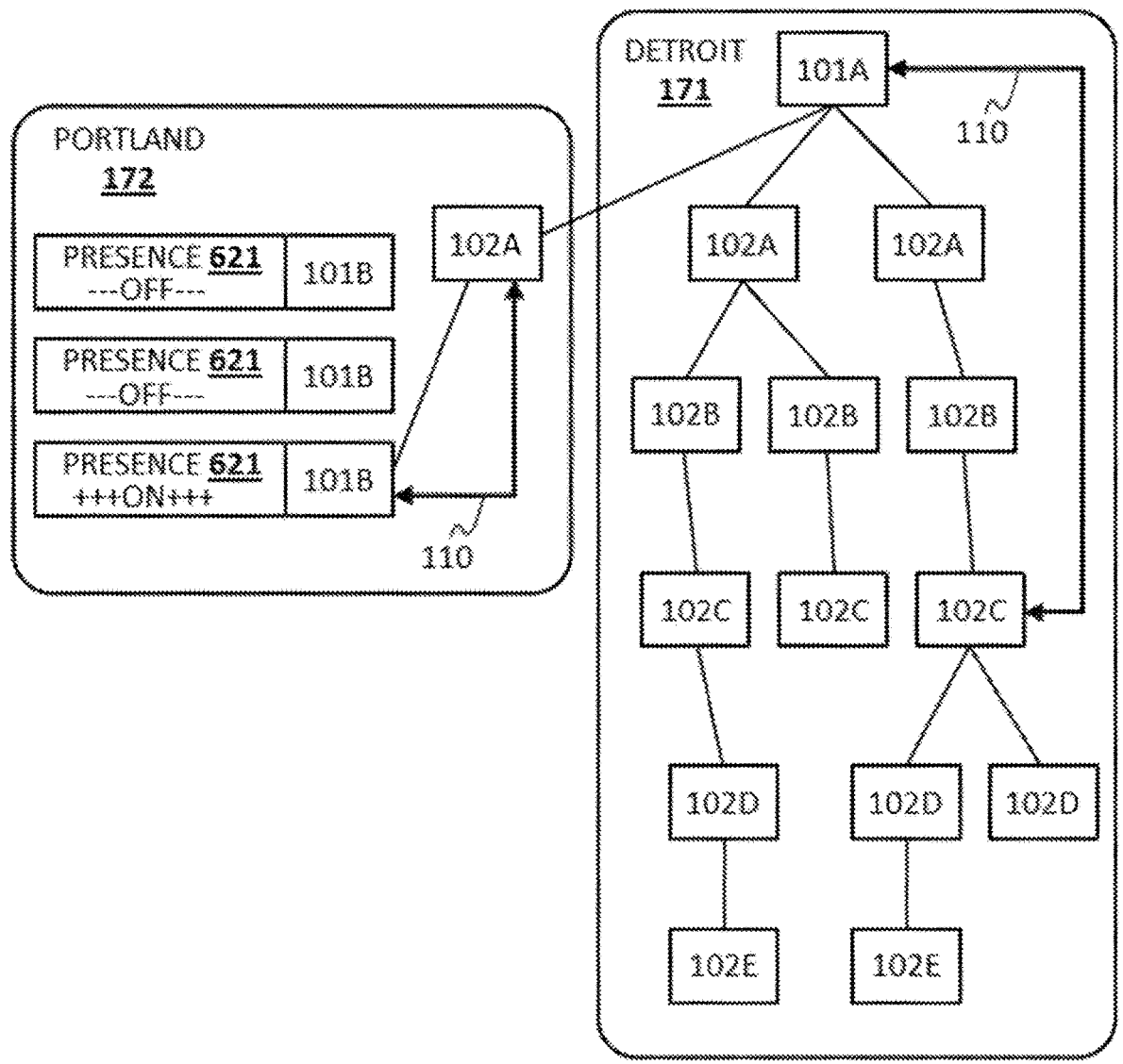
FIG. 19 depicts a block diagram of an example of how a client linked to a first member may be linked in a relationship matrix to a second member having availability or presence in the system to create a linked relationship between the client, first member, and second member according to various embodiments described herein.

A presence management application 324 may comprise a software application configured to determine if a member 101 is available. Each geographic location may have one or more members 101 associated with it. The localization application 321 may select a member 101, optionally by round robin or any other selection method, for presence 621 determination that is associated with the geographic location that the user device 400 of the client 102 is located in. In some embodiments, the presence management application 324 may determine if a member 101 is available by sending a message, such as a call or text, to the member 101, using the communication application 323, and if the member responds, the presence management application 324 may determine if a member 101 is available or has presence 621 and logged into the system 100. In further embodiments, the presence management application 324 may determine if a member 101 is available by receiving data from the user device 400 of a member 101 that describes if the member 101 desires to have their presence 621 On or desires to have their presence 621 Off as shown in FIG. 19.

An opportunity alert application 325 may comprise a software application configured to determine if a member 101 is available. The opportunity alert application 325 may be configured to create or provide an opportunity alert 632, such as an audible and/or visual message, which may be sent to the user device 400 of a member 101 having the presence 621. An opportunity alert 632 may comprise an audible and/or visual notification provided by the server 300, such as by the communication application 323, to the user device 400 of the member 101.

Using the applications 321, 322, 323, 324, 325, the system 100 and databases 106, 107, the system 100 may be configured to provide client driven referral management. In some embodiments, the system 100 may receive credentials, such as login information, licensing information or any other member descriptive information, of a first member 101A, and assign a first member unique_ID value within a data store, having a database 106, 107, of the computer memory. The unique_ID value may optionally be a ten-digit number followed by the unique number issued to the member 101. The first member unique_ID value may be linked to a first geographic area for conducting real estate transactions 171. Preferably, the first geographic area 171 may be selected by the first member 101A, such as during enrollment of the first member 101A within the system 100. The system 10 may receive credentials of a remote member 101B, and the remote member 101B may have selected a second geographic area 172 for conducting real estate transactions. The system 100 may receive electronic consent from the remote member 101B, such as by an affirmative selection made by the remote member 101B during enrollment, for a referral fee agreement and assign a remote member unique_ID value to the remote member 101B linking the remote member unique_ID value with the second geographic area 172 within the real estate information database 106. In preferred embodiments, each geographic area may be determined by a shape file, such as by the first geographic area 171 being determined by a first shape file and the second geographic area 172 is determined by a second shape file.

The system 100 may also receive client information for a first client 102A and assign a first client unique_ID value with the client information for a first client 102A in the real estate information database 106. A unique_ID value for a client may any unique identifier (ID), such as an alpha numeric string. In some embodiments, a client unique_ID value may include information which may identify one or more members 101. The system 100 may then associate the first member unique_ID value with the first client unique_ID value in the real estate information database 106 forming a linked relationship between the first member unique_ID value and the first client unique_ID value. An electronic request comprising location data, such as global positioning data, network based positioning data, a property address, and/or a shape file, useful to determine that the electronic request corresponds to a geographic area from the first client 102A, via their user device 400, may be received by the system 100. The system 100 may determine that the geographic area is the second geographic area 172 and the system 100 may also determine an available remote member 102B having selected the second geographic area 172 for conducting real estate transactions. In some embodiments, the system 100 may determine that the geographic area is a second geographic area 172 by parsing the location data to determine geographic data associated with the electronic request; determining a shape file corresponding to the geographic data; comparing the determined shape file associated with the request from the first client 102A to a record corresponding to the first geographic area 171 of the first member 101A; and determining that the geographic area is a second geographic area 172 based on the failure to match the requested shape file to the record corresponding to the first geographic area 171 of the first member 101A.

The system 100 may then attempt to establish communication 110 between the first client 102A and the remote member 101B. The system 100 may then authenticate communication 110 between the first client 102A and the remote member 101B, and upon authentication, the system 100 may automatically generate a relationship matrix 120 linking the first client unique_ID value, the first member unique_ID value, and the remote member unique_ID value and store the relationship matrix 120 within the real estate information database 106. In some embodiments, the communication a client 102 and a remote member 101B may be authenticated by the remote member answering a telephone call, the telephone call being logged by the system; the remote member responding to an electronic text message, the electronic text message being logged by the system; the remote member responding to an email, the email being logged by the system; the remote member providing tactile response to a display screen of a user device, the tactile response being logged by the system; and/or by any other suitable method for ensuring that the client 102 and member 101B communicated.

The system 100 may contain information on any number of clients 102 and members 102. Continuing the above example, in further embodiments, the system 100 may receive client information for a second client 102B and assign a second client unique_ID value in the real estate information database 106. The client information for a second client 102B may include information identifying a first client 101A, preferably the client that referred the second client 102B, such as the first client unique_ID value or the like. The first client unique_ID value may be associated in the real estate information database 106 with the second client unique_ID value forming a linked relationship between the second client unique_ID value and the first client unique_ID value in which the first client unique_ID value is associated as a superior of the second client unique_ID value in the real estate information database 106. Similarly, the system 100 may receive client information for a third client 102C and assign a third client unique_ID value in the real estate information database 106. The client information for a third client 102B may include information identifying the client that referred the third client 102C such as the second client 102B. The second client unique_ID value may be associated in the real estate information database 106 with the third client unique_ID value forming a linked relationship between the third client unique_ID value and the second client unique_ID value in which the second client unique_ID value is associated as a superior of the third client unique_ID value in the real estate information database 106.

In preferred embodiments, each client 102 may be directly and/or indirectly associated with a first member 101A in real estate information database 106. In some embodiments, when a client 102 enrolls in the system 100, they may be directly associated with the first member 101A that provided them login information to access the system 100. In further embodiments, a second client 102B may be provided login information to access the system 100 by a first client 102A, and upon enrollment in the system 100, the second client 102B may be associated with the first client 102A and the second client 102B may be indirectly associated with the first member 101A associated with the first client 102A. For example, the second client unique_ID value may be associated with the first member unique_ID value indirectly forming a linked relationship between the first member unique_ID value and the second client unique_ID value in the real estate information database 106.

In further embodiments, and continuing the above example, a relationship matrix 120 may be formed by the system 100 linking a first member 101A, second client 102B, and a remote member 101B. The system 100 may receive an electronic request from the second client 102B, via their user device 400, the electronic request comprising location data useful to determine that the electronic request corresponds to a geographic area. The system 100 may determine that the geographic area is the second geographic area, and the system 100 may determine an available remote member (having presence 621). The system 100 may then attempt to establish communication 110 between the second client 102B and the remote member 101B. The system 100 may then automatically generate a relationship matrix linking the second client unique_ID value, the first member unique_ID value, and the remote member unique_ID value upon authenticating communication 110 between the second client 101B, via their user device 400, and the remote member 101B, via their user device 400, and store the relationship matrix within the real estate information database 106.

Figure 5:
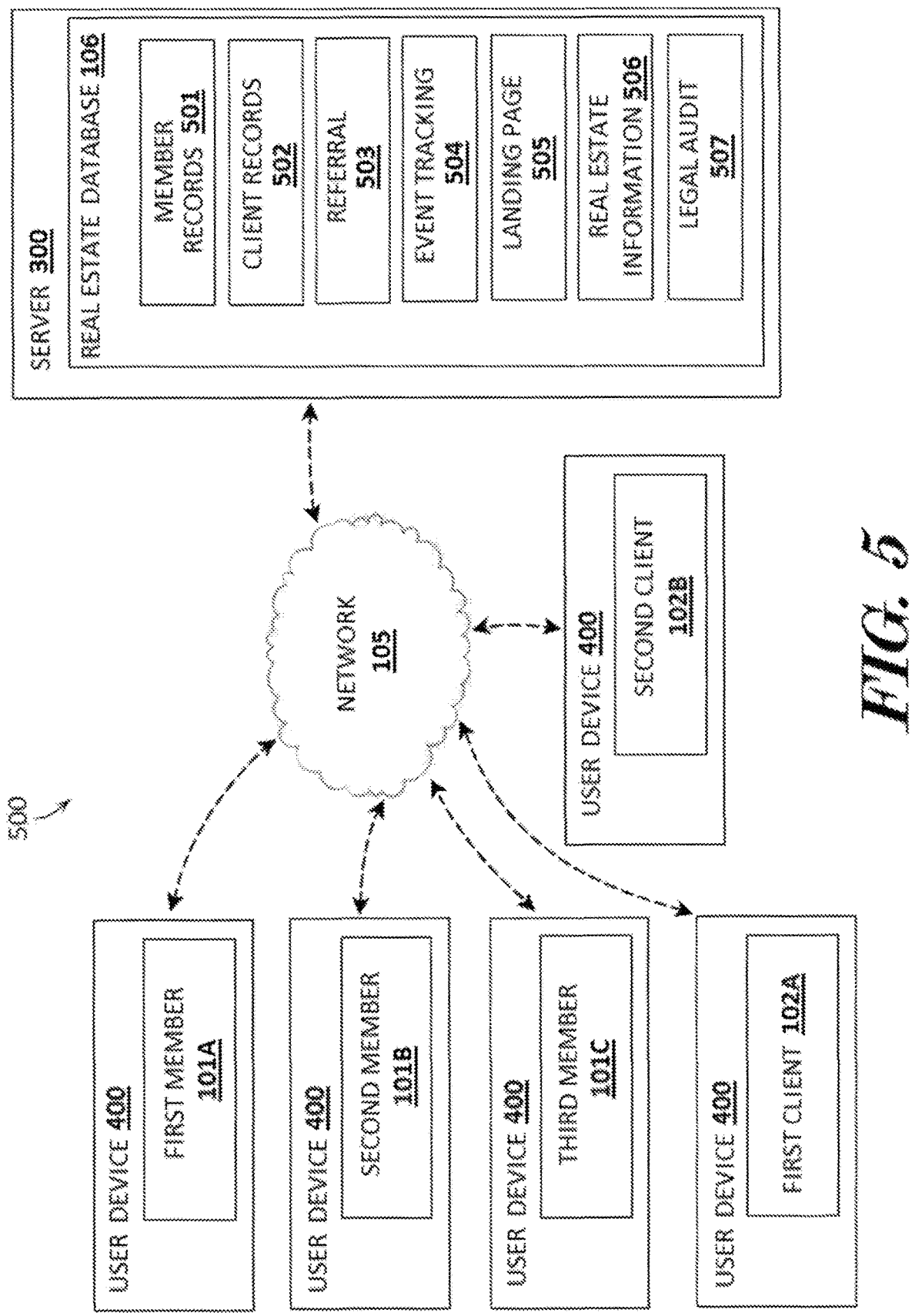
FIG. 5 illustrates a block diagram of an example of a method for registering users of the system according to various embodiments described herein.

FIG. 5 illustrates a block diagram of an example of a method for registering users of the system 100 ("the method") 500 according to various embodiments described herein. The method 500 may be used to register a user 101, 102, into the system from a user device 400 to allow one or more users 101, 102, to exchange real estate data and information describing incentives with the system 100. One or more steps of the method 500 may be performed by a localization application 321, incentivization application 322, a communication application 323, a presence management application 324, and/or opportunity alert application 325 which may be run on a server 300 and/or user device 400.

In some embodiments, the method 500 may be used to register a member 101 referred to the system 100 by another member 101. A referral communication 503, optionally sent by text message, email, or the like, may be sent to the user device 400 of a member 101 which may contain a link to the Landing Page 505. The landing page 505 may comprise a web page or portal of the system 100 including a link to download an application of the system 100 which may be run on a user device 400. The link to the Landing Page 505 may contain an identifier (ID) or unique_ID value of the member 101, such as the first member's 101 telephone number, which may be used to uniquely identify the member 101. The ID, such as a telephone number, may be passed in a URL to the Landing Page 505. An Event Tracking data base 504 may be updated to reflect that a referral 503 has sent been sent to the member 101 to register in the system 100. The server 300 may be updated to reflect the linkage or association between the Referral 503 and the member 101. The Landing Page 505 may require a full name, telephone number, home address, licensure information, MLS membership information, an email address, and/or any other information which may be used to describe a member 101. When the member 101 enters this information, such as through their user device 400, this information may be stored in the member records 501 of a real estate database. The member records 501 may be updated to reflect the fact that the member 101 has completed and submitted the Landing Page 505. In this and some embodiments, a third member 101br may comprise a real estate broker associated with the first member 101A which may be sent a message from the Legal Audit 507 with an attached real estate referral agreement for the third member 101C to affix their legally binding signature. In some embodiments, legal audit 507 may comprise a record of events concerning or supporting the legitimacy of the service provider's 101sp claim to referral fees and other compensation due the service provider 101sp. The third member 101C upon signing may cause the $3^{rd}$ party document signing system to securely stored and archive the legal agreement. The document signing software may send a message to Legal Audit 507 to record the signing of the real estate referral agreement. The member 101 may be sent a message indicating that the system application may be downloaded from the Apple App Store, Google Play store, and the like depending upon type of user device 400 used by the member 101.

The member 101 then may download the system application to their user device 400. Once installed on the user device 400, the member 101 may enter their telephone number or other ID that was entered into the Landing Page 505. The member records 501 may be updated to reflect the fact that the member 101 has signed into to the system application. At this point, the member 101 can use their user device 400 to exchange data with the system 100.

In some embodiments, the method 500 may be used to register a member 101. A referral communication 503, optionally sent by text message, email, or the like, may be sent to the user device 400 of a member 101 which may contain a link to the Landing Page 505. The landing page 505 may comprise a web page or portal of the system 100 including a link to download an application of the system 100 which may be run on a user device 400. Once at the landing page 505, the member 101 may optionally enter, edit, and/or correct information describing the member 100. The member 101 may also enter a broker name, license, MLS membership, and the member's own agent license and MLS membership. Once this information is entered, the broker and member may be contacted by the system 100. In further embodiments, once this information is entered, the member 101 and optionally the broker may be presented with documents that are required to be signed and in place before the member 101 can start making "referrals" to his/her clients 102. The documents may include a "referral fee arrangement" or a "commission fee agreement" and a "terms and conditions" which may describe how referrals are made, how commissions are to be paid, pricing structures, and other contractual information desired to be recorded by the system 100. Additionally, the documents may contain "closing instructions" which may be generally defined as instructions given to the member 101 that a specific commission is due to the service provider member 101sp or referring member 101, as well as the service provider member's 101sp electronic funds transfer detail to receive the net proceeds of closing as indicated: cashier's check, funds electronically transferred (wire transfer) to an account specified by the referring member, or trust account check. Preferably, the member 101 may also select or request the geographic areas they wish to be assigned to by the system 100 and which may be used in the referral assignment when a client 102 wishes to communicate to the member 101. The broker may then need to approve the documents, including commission sharing splits, sign, and return the documents to the system 100. In further embodiments, a document management program or application, such as DocuSign, may be used by the system 100 to get the member 101 and broker to sign the agreements. These agreements must be signed before the member 101 can start making referrals to his/her clients 102 thereby kicking off the "tree building process" or "client referral process" for that member 101. In some embodiments, the member 101 may need to wait for these events to transpire before the member 101 can start making referrals to his/her clients 102 thereby kicking off the "tree building process" or "client referral process" for that member 101. In some embodiments, the commission splits set forth in the documents provided to the member 101 may be different from market to market or geographic are to geographic area. In further embodiments, no agreements or documents may be needed to be signed or approved when a client 102 is responsible for registration of another client 102 although, there may be some terms and conditions that the client 102 must agree to before using the system 100.

In some embodiments, the method 500 may be used by a member 101 to subscribe or enroll a client 102, such as a first 102A and second 102B client, directly as a direct client 102. A direct client 102 may subscribe any client 102 invited to register in the system 100 directly by a member 101. A member 101 may send a referral communication 503, optionally sent by text message, email, or the like, from their user device 400 to the user device 400 of a client 102 which may contain a link to the Landing Page 505. The link to the Landing Page 505 may contain an identifier (ID) of the member 101, such as the member's 101 telephone number, which may be used to uniquely identify the member 101. The ID, such as a telephone number, may be passed in a URL to the Landing Page 505. An Event Tracking data base 504 may be updated to reflect that a referral 503 has sent been sent to the client 102 to register in the system 100. The member records 501 and client records 502 may be updated to reflect the linkage or association between the member 101 and the client 102. The Landing Page 505 may require a full name, telephone number, home address, and/or email address. When the client 102 enters this information, this information may be stored in the Client Records 502, and the client 102 may be transferred using the network 105 to the Apple App Store, Google Play store, and the like depending upon type of user device 400 used by the client 102. The Event Tracking 504 may be updated to reflect the fact that the client 102 has completed and submitted the Landing Page 505. The client 102 then may download the system application to their user device 400. Once installed on the user device 400, the client 102 may enter their telephone number or other ID that was entered into the Landing Page 505. The Event Tracking 504 may be updated to reflect the fact that the client 102 has signed into to the system application. The Client Records 502 may be updated to reflect the fact that the client 102 refers back or is associated to the member 101. At this point, the client 102 can use their user device 400 to exchange data with the system 100.

In some embodiments, one or more of the applications 321, 322, 323, 324, may be accessible or downloadable from an App Store, such as Google Play, Apple Store, and the like, and as such allow anyone to download and access the system 100 their user device 400. A user 101, 102, of the system that accessed the system 100 in this manner may not be referred by a member 101 or another client 102 and therefore may not be initially associated with a member 101 or client 102 during registration. Optionally, these users 101, 102, may be associated with a member 101 and/or client 102 by using their GPS position, which may be provided by their user device 400, and assign or associate them as a client 102 of one of the members 101 within that geographic area which encompasses their location. In order to do this, the system 100 may create a "virtual direct client" under that member 101 that was selected for that area. In further embodiments, the system 100 may allow the user 101, 102, to optionally enter their phone number or other unique ID that may already be in the system 100 since a member 101 or direct client 102 referred them, or optionally they may indicate that no one referred them. In the latter case, they may need to enter name, phone, address, or other identifying information preferably in a "portal page" much like a landing page, which may be displayed on their user device 400 where they may enter that information. Once they enter all the required information, the user 101, 102, may begin using the system 100.

In some embodiments, the method 500 may be used by a direct client, such as a first client 102A to register a client 102, such as a second 102B client, indirectly as an indirect direct client 102. An indirect client 102 may describe any client 102 not invited to register in the system 100 directly by a member 101. The direct first client 102A sends a referral communication 503, optionally sent by text message, email, or the like, from their user device 400 to the user device 400 of a indirect second client 102B which may contain a link to the Landing Page 505. The link to the Landing Page 505 may contain an identifier (ID) or unique_ID value of the direct first client 102A, such as the direct first client's 102A telephone number, which may be used to uniquely identify the direct first client 102A. The ID, such as a telephone number, may be passed in a URL to the Landing Page 505. An Event Tracking data base 504 may be updated to reflect that a referral 503 has sent been sent to the second client 102A to register in the system 100. The Client Records 502 may be updated to reflect the linkage or association between the first client 102A and the second client 102B. The Landing Page 505 may require a full name, telephone number, home address, and/or email address. When the second indirect client 102B enters this information, this information may be stored in the Client Records 502, and the second indirect client 102B may be transferred using the network 105 to the Apple App Store, Google Play store, and the like depending upon type of user device 400 used by the second indirect client 102B. The Event Tracking 504 may be updated to reflect the fact that the second indirect client 102B has completed and submitted the Landing Page 505. The second indirect client 102B then may download the system application to their user device 400. Once installed on the user device 400, the second indirect client 102B may enter their telephone number or other ID that was entered into the Landing Page 505. The Event Tracking 504 may be updated to reflect the fact that the second indirect client 102B has signed into to the system application. The Client Records 502 may be updated to reflect the fact that the second indirect client 102A refers back or is associated to the first client 102A. At this point, the second indirect client 102B can use their user device 400 to exchange data with the system 100.

In some embodiments, the method 500 may be used by an indirect client, such as a first client 102A to register another indirect client 102, such as a second 102B client, indirectly as an indirect direct client 102. The indirect first client 102A may send a referral communication 503, optionally sent by text message, email, or the like, from their user device 400 to the user device 400 of an indirect second client 102B which may contain a link to the Landing Page 505. The link to the Landing Page 505 may contain an identifier (ID) or unique_ID value of the indirect first client 102A, such as the indirect first client's 102A telephone number, which may be used to uniquely identify the indirect first client 102A. The ID, such as a telephone number, may be passed in a URL to the Landing Page 505. An Event Tracking data base 504 may be updated to reflect that a referral 503 has sent been sent to the second indirect client 102A to register in the system 100. The Client Records 502 may be updated to reflect the linkage or association between the first indirect client 102A and the second indirect client 102B. The Landing Page 505 may require a full name, telephone number, home address, and/or email address. When the second indirect client 102B enters this information, this information may be stored in the Client Records 502, and the second indirect client 102B may be transferred using the network 105 to the Apple App Store, Google Play store, and the like depending upon type of user device 400 used by the second indirect client 102B. The Event Tracking 504 may be updated to reflect the fact that the second indirect client 102B has completed and submitted the Landing Page 505. The second indirect client 102B then may download the system application to their user device 400. Once installed on the user device 400, the second indirect client 102B may enter their telephone number or other ID that was entered into the Landing Page 505. The Event Tracking 504 may be updated to reflect the fact that the second indirect client 102B has signed into to the system application. The Client Records 502 may be updated to reflect the fact that the second indirect client 102A refers back or is associated to the first indirect client 102A. At this point, the second indirect client 102B can use their user device 400 to exchange data with the system 100.

Figure 6:
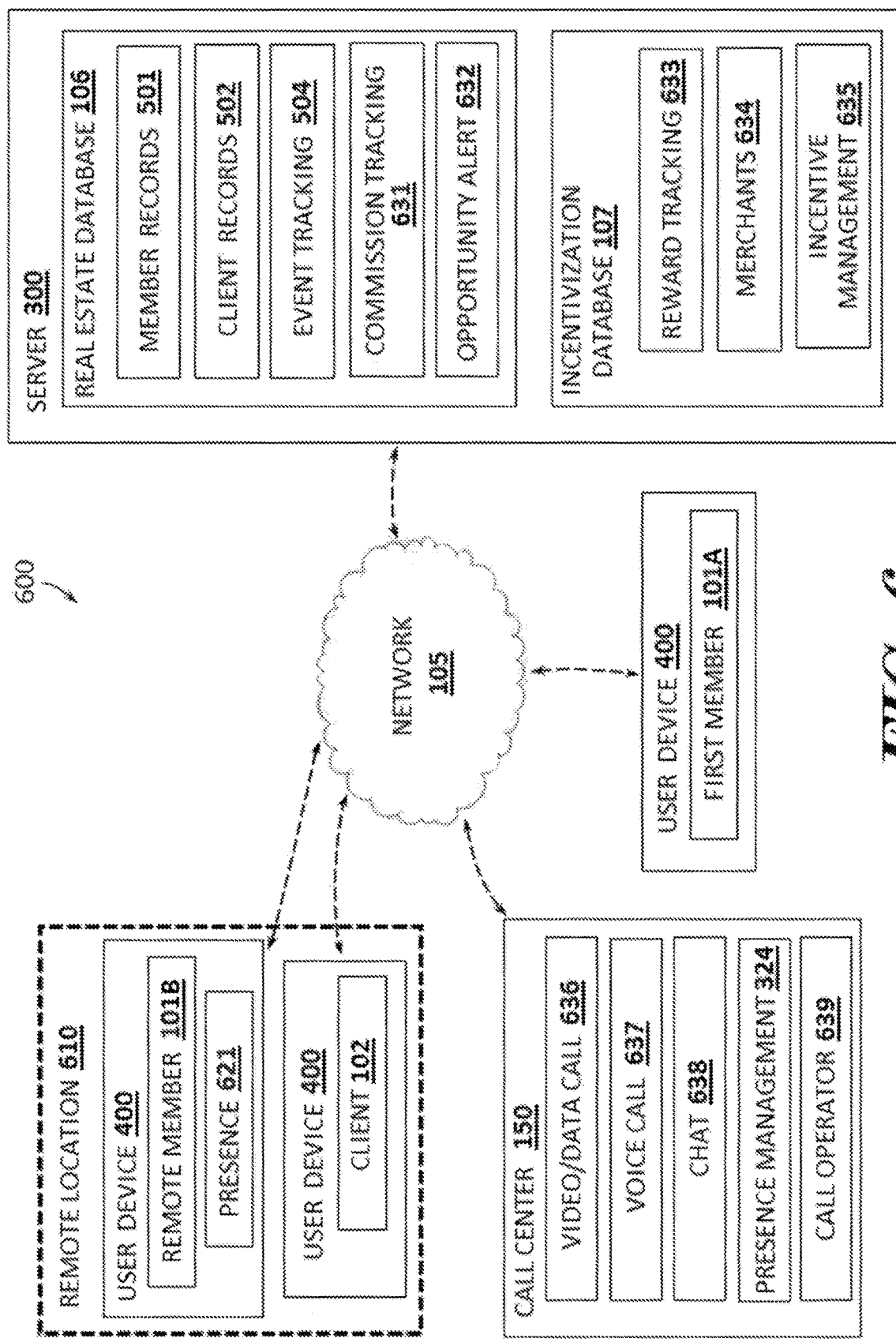
FIG. 6 shows a block diagram of an example of a method for enabling communication between users of the system according to various embodiments described herein.

FIG. 6 shows a block diagram of an example of a method for enabling communication between users 101, 102, of the system 100 ("the method") 600 according to various embodiments described herein. The method 600 may be used to enable a remote user of the system 100 with a user device 400 to exchange real estate data and information describing incentives with the system 100. In some embodiments, a remote user may include a second member 101B that is in a remote location 610 or area remote or distant from the home location of a client 102 and the operating area of a first member 101A which enabled the registration of the client 102 into the system 100. One or more steps of the method 600 may be performed by a localization application 321, incentivization application 322, a communication application 323, a presence management application 324, and/or opportunity alert application 325 which may be run on a server 300 and/or user device 400.

In some embodiments, when a client 102 accesses the system 100 with a user device 400, location data, such as GPS coordinates (longitude and latitude) and network location data, may be provided by the user device 400 to the localization application 321 (FIG. 4). The server 300 may comprise a real estate database 106 of geographic areas and real estate information describing each geographic area. The localization application 321, optionally running on a server 300, may provide real estate information 506 (FIG. 5) to the user device 400 of the client 102 which describes the geographic area the user device 400 of the client 102 is located in. For example, a map encompassing the GPS coordinates of the user device 400 may be retrieved from the real estate database 106 and displayed on the User device 400. The location data, such as GPS coordinates, may also be used to retrieve a geographic area as a neighborhood shapefile or the like from the server 300. If a neighborhood shapefile is not found, then a geographic area based on the Zip Code that the user device 400 is in may be retrieved from the server 300. The geographic area may comprise or be defined by a shapefile which may include a set of latitude and longitude coordinates which may define a closed polygon's boundary. This polygon may be overlaid upon the map displayed on the user device 400. In this manner and in preferred embodiments, the system 100 may not require and may not utilize the identification of a landmark in order to fix the location of the client 102. In contrast and in some embodiments, the system 100 may retrieve a shapefile representing a neighborhood, zip code, or the like, from a real estate database 106 and retrieve the real estate properties and real estate information that falls within the polygon of the shapefile. The location data, such as the GPS coordinates may also be used to show the exact position of the client 400 on the map. The user device 400 of the client 102 may send an event message with the real estate information browsing data of the client 102, which may include date, time, position, GPS coordinates or other location descriptive data, shape ID, client ID and event ID signifying the client 102 has accessed the system 100 on their user device 400 and the event may be recorded in Event Tracking 504.

At this point, the user device 400 display may show a map of the geographic area or local area with the client's 102 current position and a closed polygon representing the geographic area as a neighborhood or zip code area. The display may also show several buttons (one being for real estate information) which allow for more information to be displayed on the user device 400, such as on the map, or optionally the data may be presented on another display for non-map data such as textual information.

In some embodiments, the Client 102 may request real estate information using their user device 400. Location data, such as GPS coordinates (longitude and latitude) and network location data, may be provided by the user device 400 to the localization application 321. For example, the GPS coordinates of the user device 400 may be used, by the communication application 323 (FIG. 4) to access a property listing database to retrieve real estate data comprising property listings which may be in the geographic area, optionally displayed as a shapefile on a map, that the user device 400 is located in. The real estate data which includes the property listings may contain the property listings data (property ID number, GPS location of property, street address, etc.) within the boundaries of the shapefile of the geographic area. Preferably, a symbol of icon for each property may be displayed on the map presented on the user device 400.

The user device 400 of the client 102 may send an event message with data, which may include the real estate information browsing data such as date, time, client ID, shape ID and event ID to the event tracking 504 signifying the client 102 has accessed the system 100 on their user device 400 and the event may be recorded in event tracking 504. Optionally, upon reception of the message, the communication application 323 may enable communication between the user device 400 of the client 102 and a chatbot. The Chatbot may provide consumer tailored services to a client 102 on behalf of a member 101, addressing the needs of soft prospects who want information, but who are not yet ready to personally engage with an actual member 101, while nurturing that growing consumer relationship with an actual member 101 through the delivery of automated, smart services without the member's 101 active involvement. This automation enables a member 101 to personally engage with a prospect client 102 at the moment when the client 102 is finally ready to commit to the buying or selling process. In further embodiments, a presence management application 324 may send an opportunity alert 632 message to the user device 400 of a member 101 via a Chatbot system with a screen prompt on the user device 400 that lets the member 101 know there is a client opportunity and for the member 101, via the chatbot on their user device 400 may respond back to accept or reject the opportunity to communicate with the client 102. Optionally, upon reception of the message, the communication application 323 may request from a presence management application 324 whether a remote or second member 101B is available to receive a call or chat from the client 102.

A presence management application 324 may comprise a software application configured to determine if a member 101 is available. Each geographic location may have one or more members 101 associated with it. The localization application 321 may select a member 101, optionally by round robin or any other selection method, for presence 621 determination that is associated with the geographic location that the user device 400 of the client 102 is located in. In some embodiments, each member 101B may have selected to turn On or to turn Off their presence 621 or availability via their respective client device 400, as shown in FIG. 19, enabling the presence management application 324 to determine that members 101B having their presence 621 off are not available and members 101B having their presence 621 on are available. In further embodiments, the presence management application 324 may determine if a member 101 is available by sending a presence message, such as a text message, an email message, an electronic message sent through a presence management application 324 installed on the user device 400 of the remote member 101B, and/or a phone call, to the member 101, using the communication application 323, and if the member responds, the presence management application 324 may determine if a member 101 is available or has presence 621 in the system 100. In this manner, the presence management application 324 may determine the availability or presence 621 of the remote member 101B.

The opportunity alert application 325 may send an opportunity alert 632 communication to the user device 400 of a remote member 101B associated with the location described by the client 102 real estate information browsing data. Preferably, an opportunity alert 632 may be provided to a user device 400 of the remote member 101B prior to making an attempt to establish communication between the client 102 and the remote member 101B. An opportunity alert 632 may comprise a notification to the second member 101 by the server 300, such as by the communication application 323, to the user device 400 of the remote member 101B that the client 102 is reviewing real estate information of a location or geographic area that the remote member 101B is practicing in. In some embodiments, an opportunity alert 632 may comprise a notification such as a text message, a phone call, a chatbot, chatbot communication, a notification onto a display screen of the user device 400, and/or a sound played by the user device 400. By interacting with the opportunity alert 632 on their user device 400, a remote member 101B may indicate to the opportunity alert application 325 that they are available to communicate with the client 102. If the remote member 101B is available or has presence 621, the presence management application 324 may confirm that the remote member 101B can accept the communication by signaling the communication application 323 to establish communication with the user device 400 of the remote member 101B should the client 102 indicate on their user device 400 a desire to communicate with a remote member 101B. In preferred embodiments, the system 100 may initiate an attempt to establish communication between the remote member's 101B user device 400 and a client's 102 user device 400 only after determining presence 621 or availability of the remote member 101B. In further embodiments, the system 100 may attempt to establish communication between a user device 400 of a client 102 and a user device 400 of a second remote member 101B upon failure to establish presence of a first remote member 101B. Once confirmed, the presence management application 324 may provide this information to the communication application 323 which may then enable communication between the remote member 101B and the client 102. If the client 102 indicates on their user device 400 that they would like to communicate with a remote member 101B, the communication application 323 may then establish communication, such as a call, text or chat messaging, between the user devices 400 of the remote member 101B and the client 102. If the member 101 is not available or without presence 621, the presence management application 324 may select the next remote member 101B associated with that geographic area that the user device 400 of the client 102 is located in. The presence management application 324 may use a round-robin queue to determine the specific remote member 101 to be alerted, by way of an opportunity alert 632, of a possible business opportunity and to standby for contact from or with the client 102 through their respective user devices 400.

The presence management application 324 may wait for a reply from the user device 400 of the member 101 for a short period of time. If no reply is received within that period of time, the next remote agent 101 may be sent an opportunity alert 632 alert message or the like or an equivalent. If the remote agent 101 replies that they are available, then that particular remote agent 101 may become the active remote agent 101 for that client 102 for the duration of a set period of time or opportunity time period. After the opportunity period has expired, a new remote member 101 may be assigned to that client 102. If no remote member 101 is available as determined by presence management application 324, the any communication, such as a video/data call 636, voice call 637, chat 638 or the like or equivalent, from the client 102 may be is answered by a call operator 639 of the call center 150 of the system 100.

If the client 102 requests detailed real estate information, using their user device 400, about a single property listing, the information may be retrieved from any real estate information source, such as a property listing database, and/or from the real estate database 106 by the communication application 323, preferably formatted into an easily understood format and displayed on the user device 400 of the client 102. Next, the user device 400 of the client 102 may send an event message which includes the real estate information browsing data, such as event ID, date, time, position, property ID, client ID, indicating the Client 102 has requested real estate information on a particular real estate property listing on their user device 400 and the event may be recorded in event tracking 504.

If the Client 102 requests to compare real estate information on a single property listing address with their current home address, the single listing real estate information may be retrieved from the real estate database 106 by the communication application 323 and their current home address may be retrieved from their client profile of the client records 502.

In some embodiments, the client 102 may provide a residence location or home address to the server 300 such as during client 102 registration. The server 300 may comprise a database of geographic areas and real estate information describing each geographic area or the communication application may retrieve the real estate data from one or more property listing databases or servers. The localization application 321 and the communication application 323 of the server 300 may provide real estate information to the user device 400 of the client 102 which describes the geographic area which encompasses the residence location of the client 102. In further embodiments, the client 102 may provide a residence location to the server 300 such as during client 102 registration.

The localization application 321 and the communication application 323 of the server 300 may provide real estate information to the user device 400 of the client 102 which describes a comparison between the real estate information of the geographic area the user device 400 of the client 102 is located in and the real estate information of the geographic area which encompasses the residence location of the client 102. A comparison of the real estate information may be provided and displayed on the display of the user device 400. Compared real estate information may include any data and information about the real estate properties, geographic locations, and/or geographic areas which client 102 will find useful. For example the comparison may include home prices, average home prices of the geographic areas, crime statistics, proximate businesses and services, tax information, owner history information, flood plain status, etc.

In some embodiments, if the Client 102 requests communication using their user device 400 such as a video/data call 636, voice call 637, chat 638, with the Remote member 101B, the Call Center 150 may answer or field the communication and may connect the user device 400 of the client 102 to the remote member 101B. In further embodiments, the server 300 may enable communication between the user device 400 of the remote member 101B and the user device 400 of the client 102 optionally by way of a communication application 323. By virtue of accepting the communication, the remote member 101B will confirm their acceptance of the client 102 according to the terms and conditions of a license agreement or referral fee agreement which the member 101 may be presented with when the member 101 registered in the system 100. Optionally, the Call Center 150 may send a message preferably including data such as message ID, data, time, client ID, property ID, agent ID to the server 300 indicating the remote member 101B has accepted the communication. This message and information may be stored in the member records 501, client records 502, event tracking 504, and/or commission tracking 631 of the real estate database 106 indicating that a referral relationship exists between the first member 101A which was associated with the client 102 during registration, the Remote or second member 101B which communicated with the client 102.

In some embodiments, when the client 102 purchases real estate, the commissions may be split between the first or local member 101A, the remote or second member 101B, and with the service provider 101*sp* or administrators of the system 100. The localization application 321 may be configured to periodically scan a public records database and the like, the real estate sales data in the zip code areas and property listing databases which are assigned to the second member 101B and the data may be stored as commission tracking 631. The sales in an area can be matched using the remote member 101B and the client 102 information stored in the real estate database 106 such as in member records 501 and client records 502. A real estate property sale may comprise an incentivization activity. Optionally this data may be verified, such as by a human or the incentivization application 322. Preferably, the incentivization application 322 may be configured to only award an appropriate incentive, such as a number of points, to the direct client 102A or indirect client 102B, which facilitated the registration of the purchasing indirect client 102B, if the real estate property was purchased by the indirect or second client 102B. Optionally, no points may be awarded to the direct client 102A or indirect client 102B if the real estate property was purchased by a direct client 102A that did not facilitate the registration of an indirect client 102B. Preferably, a first indirect client 102B can be awarded points for purchase of real estate properties by other subordinate indirect clients 102B that the first indirect client 102B facilitated or enabled registration of into the system 100.

In some embodiments, a client 102 may redeem incentives, such as points, using the incentivization application 322 for goods and services which typically include gift cards to local merchants. When the incentives are redeemed, the data may be stored or retrieved in the incentivization database 107, such as in reward tracking 633 and/or incentive management 635. The available merchants 634 and the redeemable goods and services provided by the merchants 634 may be stored and retrieved in the merchants 634 information in the incentivization database 107. Once incentives are redeemed, the incentive balance of the client 102 and the point balance for the client 102 may be decreased accordingly.

Figure 7:
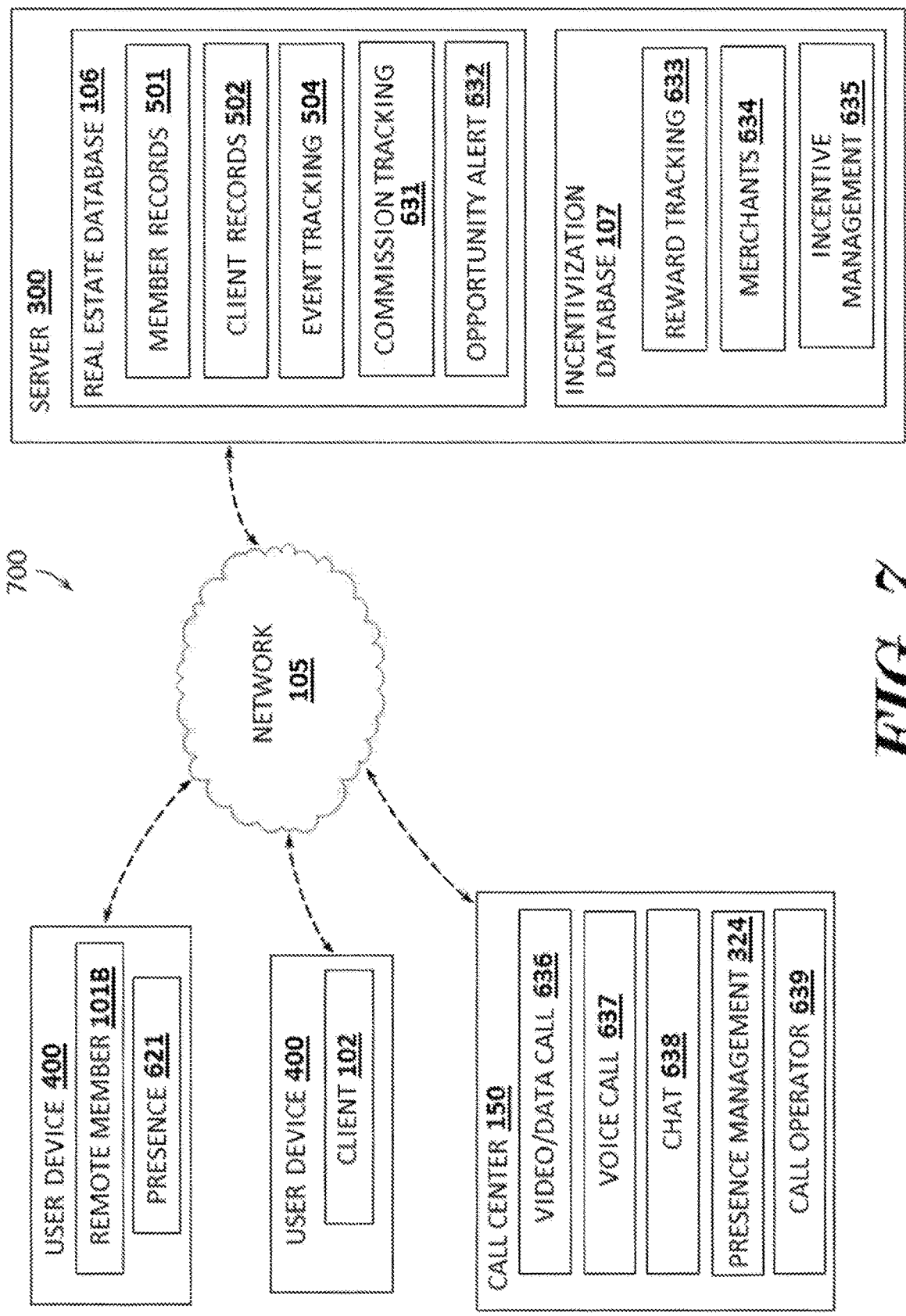
FIG. 7 depicts a block diagram of an example of an alternative method for enabling communication between users of the system according to various embodiments described herein.

FIG. 7 shows a block diagram of an example of an alternative method for enabling communication between clients and members 101, 102, of the system 100 ("the method") 700 according to various embodiments described herein. The method 700 may be used to enable a user 101, 102, of the system 100 with their respective device 400 to exchange real estate data and information describing incentives with the system 100. A user 101, 102, may include a member 101 and a client 102 that are in a location or area local to each other but the location may be remote from the client's home location or a location from a first or registering member 101A. For example, a client 102 may in the geographic area operated in by a remote member 101B that is a remote location or location distant from the client's home location or a location that a first or registering member 101A does not operate in. One or more steps of the method 700 may be performed by a localization application 321, incentivization application 322, a communication application 323, a presence management application 324, and/or opportunity alert application 325 which may be run on a server 300 and/or user device 400.

In some embodiments, when a client 102 accesses the system 100 with a user device 400, location data, such as GPS coordinates (longitude and latitude) and network location data, may be provided by the user device 400 to the localization application 321 (FIG. 4). The server 300 may comprise a real estate database 106 of geographic areas and real estate information describing each geographic area. The localization application 321, optionally running on a server 300, may provide real estate information to the user device 400 of the client 102 which describes the geographic area the user device 400 of the client 102 is located in. For example, a map encompassing the GPS coordinates of the user device 400 may be retrieved from the real estate database 106 and displayed on the user device 400. The location data, such as GPS coordinates, may also be used to retrieve a geographic area as a neighborhood shapefile or the like from the server 300. If a neighborhood shapefile is not found, then a geographic area based on the zip code that the user device 400 is in may be retrieved from the Server 300. The geographic area may comprise a shapefile which may include a set of latitude and longitude coordinates which may define a closed polygon's boundary. This polygon may be overlaid upon the map displayed on the user device 400. The location data, such as the GPS coordinates may also be used to show the exact position of the client 400 on the map. The User device 400 of the client 102 may send an event message with the real estate information browsing data of the client 102, which may include date, time, position, shape ID, client ID and event ID signifying the client 102 has accessed the system 100 on their user device 400 and the event may be recorded in event tracking 504.

At this point, the user device 400 display may show a map of the geographic area or local area with the client's 102 current position and a closed polygon representing the geographic area as a neighborhood or zip code area. The display may also show several buttons (one being for real estate information) which allow for more information to be displayed on the user device 400, such as on the map, or optionally the data may be presented on another display for non-map data such as textual information.

In some embodiments, the client 102 may request real estate information using their user device 400. Location data, such as GPS coordinates (longitude and latitude) and network location data, may be provided by the user device 400 to the localization application 321. For example, the GPS coordinates of the user device 400 may be used, by the communication application 323 (FIG. 4) to access a real estate database 106 to retrieve real estate information and data comprising real estate property listings which may be in the geographic area, optionally displayed as a shapefile on a map, that the user device 400 is located in. The real estate data which includes the property listings may contain the property data (property ID number, GPS location of property, street address, etc.) within the boundaries of the shapefile of the geographic area. Preferably, a symbol of icon for each property may be displayed on the map presented on the user device 400.

The user device 400 of the client 102 may send an event message with data, which may include the real estate information browsing data such as date, time, client ID, shape ID and event ID to the event tracking 264 signifying the client 102 has accessed the system 100 on their user device 400 and the event may be recorded in Event Tracking 504. Upon reception of the message, the opportunity alert application 325 may send an opportunity alert 632 communication to the user device 400 of a remote member 101B associated with the location described by the client 102 real estate information browsing data. By interacting with the opportunity alert 632 on their user device 400, the remote member 101B may indicate to the opportunity alert application 325 that they are available to communicate with the client 102. If the client 102 indicates on their user device 400 that they would like to communicate with a remote member 101B, the communication application 323 may request from a presence management 324 application the remote member 101B is available to receive a call or chat from the client 102. A presence management application 324 may comprise a software application configured to determine if a remote member 101B is available. Each geographic location may have one or more members 101 associated with it. The presence management application 324 may determine if the remote member 101B is available by sending a message, such as a call or text, to the member 101, using the communication application 323, and if the member responds, the presence management application 324 may determine if the remote member 101B is available or has presence 621 in the system 100.

If the remote member 101B is available or has presence 621, the presence management application 324 may confirm that the remote member 101B can accept the communication. Once confirmed, the presence management application 324 may provide this information to the communication application 323 which may then enable communication between the remote member 101B and the client 102. If the remote member 101B is not available or without presence 621, the presence management application 324 may select a call operator 639 of the call center 150 to receive the communication on behalf of the member 101.

If the Client 102 requests detailed real estate information, using their user device 400, about a single property listing, the information may be retrieved from the real estate database 106 by the communication application 323, preferably formatted into an easily understood format and displayed on the user device 400 of the client 102. Next, the user device 400 of the client 102 may send an event message which includes the real estate information browsing data, such as event ID, date, time, position, property ID, client ID, indicating the client 102 has requested real estate information on a particular real estate property listing on their user device 400 and the event may be recorded in event tracking 504.

If the Client 102 requests to compare real estate information on a single property listing address with their current home address, the single listing real estate information may be retrieved from the real estate database 106 by the communication application 323 and their current home address may be retrieved from their client profile of the client records 502.

In some embodiments, the client 102 may provide a residence location or home address to the server 300 such as during client 102 registration. The server 300 may comprise a database of geographic areas and real estate information describing each geographic area or the communication application may retrieve the real estate information from one or more real estate databases 106, third part property listing databases or servers, and/or any other suitable real estate listing source. The localization application 321 and/or the communication application 323 of the server 300 may provide real estate information to the user device 400 of the client 102 which describes the geographic area which encompasses the residence location of the client 102. In further embodiments, the client 102 may provide a residence location to the server 300 such as during client 102 registration.

The localization application 321 and the communication application 323 of the server 300 may provide real estate information to the user device 400 of the client 102 which describes a comparison between the real estate information of the geographic area the user device 400 of the client 102 is located in and the real estate information of the geographic area which encompasses the residence location of the client 102. A comparison of the real estate information may be provided and displayed on the display of the user device 400. Compared real estate information may include any data and information about the real estate properties, geographic locations, and/or geographic areas which client 102 will find useful. For example the comparison may include home prices, average home prices of the geographic areas, crime statistics, proximate businesses and services, tax information, owner history information, flood plain status, etc.

In some embodiments, if the client 102 requests communication using their user device 400 such as a video/data call 636, voice call 637, chat 638, with the member 101, the call center 150 may answer or field the communication and may connect the user device 400 of the client 102 to the member 101. In further embodiments, the server 300 may enable communication between the user device 400 of the remote member 101B and the user device 400 of the client 102 optionally by way of a communication application 323. By virtue of accepting the communication, the remote member 101B will confirm their acceptance of the client 102 according to the terms and conditions of a license agreement or referral fee agreement which the remote member 101B may be presented with when the remote member 101B registered in the system 100. Optionally, the Call Center 150 may send a message preferably including data such as message ID, data, time, client ID, property ID, agent ID to the server 300 indicating the remote member 101B has accepted the communication. This message and information may be stored in the member records 501, client records 502, event tracking 504, and/or commission tracking 631 of the real estate database 106 indicating that a referral relationship exists between the remote member 101B which was associated with the client 102 during registration.

In some embodiments, when the client 102 purchases real estate, the commissions may be split depending upon whether the client 102 is a direct client or indirect client of the member 101. If the client 102 is a direct client within the local member's MLS, the administrators of the system 100 may not receive any commissions. Optionally, there may be cases where the MLS is large geographically and a local member may want to have the call handled by another member in the same MLS and the commissions may be split by the local member and the member in the same MLS that communicates with and completes a real estate transaction with a client 102 of the local member. However, if the client 102 is an indirect client of the member 101, the commissions may be split or divided between one or more members 102 members and the administrators of the system 100. The commission splits are recorded in the commission tracking 631. The localization application 321 may be configured to periodically scan the real estate sales data in the property listing databases, such as MLS databases, in the Zip Code areas which are assigned to the remote member 101B and the data may be stored as commission tracking 631. The sales in an area can be matched using the remote member 101B and the client 102 information stored in the real estate database 106 such as in member records 501 and client records 502. A real estate property sale may comprise an incentivization activity. Optionally this data may be verified, such as by a human or the incentivization application 322. Preferably, the incentivization application 322 may be configured to only award an appropriate incentive, such as a number of points, to the direct client 102 or indirect client 102, which facilitated the registration of the purchasing indirect client 102, if the real estate property was purchased by the indirect or second client 102. Optionally, no points may be awarded to the direct client 102 or indirect client 102 if the real estate property was purchased by a direct Client 102 that did not facilitate the registration of an indirect client 102. Preferably, a first indirect Client 102 can be awarded points for purchase of real estate properties by other indirect clients 102 that the first indirect Client 102 facilitated or enabled registration of into the system 100.

In some embodiments, a client 102 may redeem incentives, such as points, using the incentivization application 322 for goods and services which typically include gift cards to local merchants. When the incentives are redeemed, the data may be stored or retrieved in the incentivization database 107, such as in reward tracking 633 and/or incentive management 635. The available merchants and the merchant's redeemable goods and services provided by the merchants may be stored and retrieved in the merchants 634 in the incentivization database 107. Once incentives are redeemed, the incentive balance of the client 102 and the point balance for the client 102 may be decreased accordingly.

Figure 8:
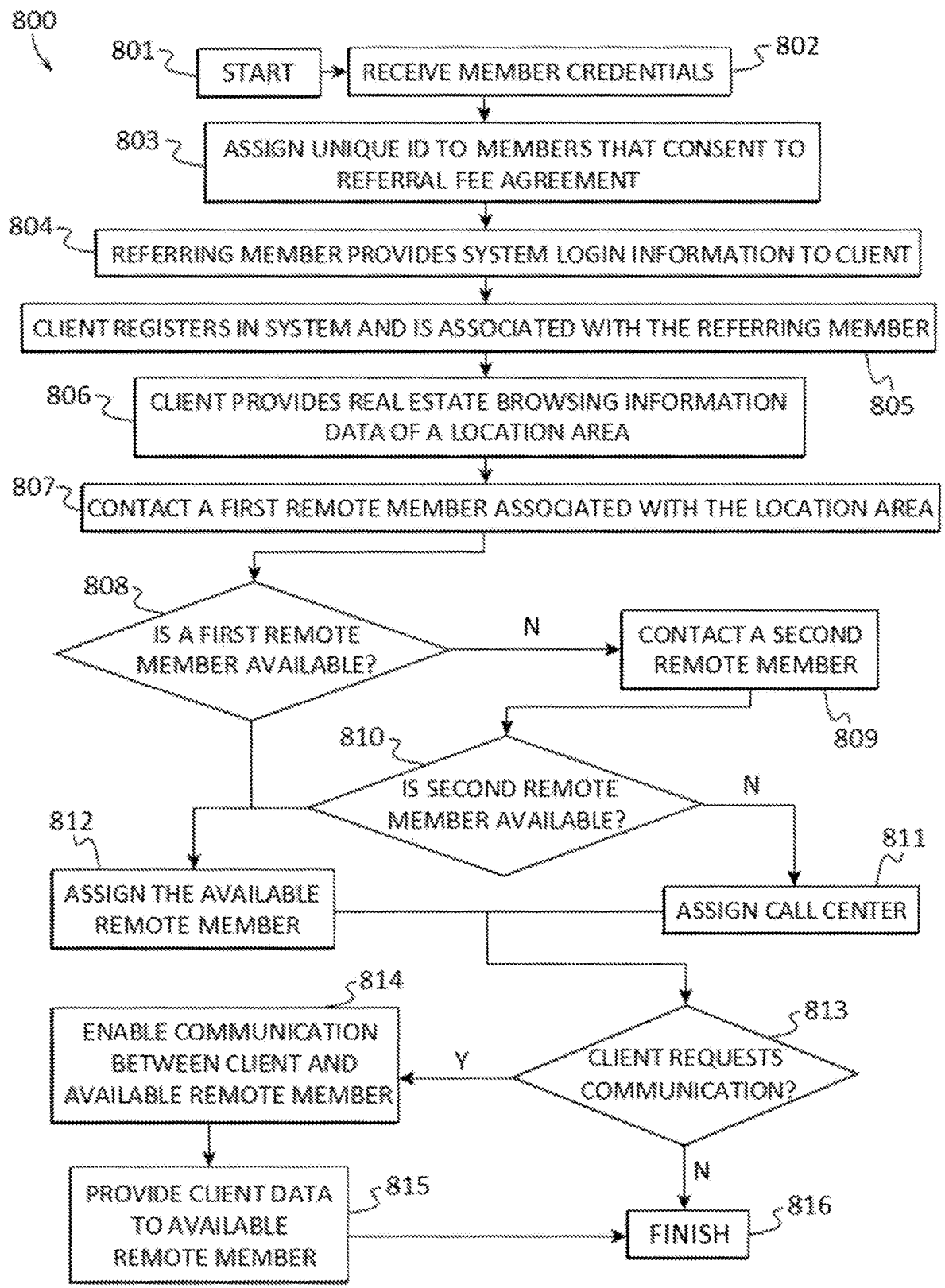
FIG. 8 illustrates a block diagram of an example of a dynamic referral agreement generation method according to various embodiments described herein.

FIG. 8 illustrates a block diagram of an example of a dynamic referral agreement generation method ("the method") 800 according to various embodiments described herein. The method 800 may be used to provide the consent of one or more members 101 to a referral fee agreement which may be used to split and divide referral fees between one or more members 101 and/or the service providers 101sp of the system 100. One or more steps of the method 800 may be performed by a localization application 321, incentivization application 322, a communication application 323, a presence management application 324, and/or opportunity alert application 325 which may be run on a server 300 and/or user device 400.

In some embodiments, the method 800 may start 801 and one or more member 101 credentials may be received by the communication application 323 in step 802. Member credentials may include a data describing the member 101 such as a phone number, email address, business address, home address, licensure information, property listing memberships, preferred client and real estate property information, and the like. Member 101 credentials may be provided through the user device 400 of the member 101. In further embodiments, member 101 credentials may be provided as the member 101 registers in the system 100. In still further embodiments, the member credentials may include the presentation of a referral fee agreement which may be used to form a contract of how referral or commission fees may be split between one or more members 101 and/or administers of the system 100. Successful registration of the member 101 may be dependent upon the member's consent to the referral fee agreement.

In step 803 a unique identifier (ID), such as an alpha numeric string, may be assigned to the member 101 as a unique_ID value that consents to referral commission agreement by the localization application 321. The unique identifier (ID) may allow the member 101 to function as a local member 101A and a remote member 101B. In some embodiments, each member 101 may be automatically assigned a unique identity or unique identifier (ID) as a unique_ID value. The unique_ID value may optionally be a ten-digit number followed by the unique number issued to the member 101. For example, since there are approximately 67,000 real estate brokerages in the United States, each may be assigned a five-digit number followed by the unique identification number issued to the agent at the time of registration. For example, 10001 (broker number) plus the unique identifier for the member (5613051566) or 10001-5613051566. When additional agents or members register in the system 100 which are represented by the same licensed real estate broker, the following unique_ID value will be assigned, 10001-XXXXXXXXXX, such as 10001-2147630261.

As shown by the example of FIG. 1, a local member 101A may be the member that enabled the registration of the client 102A to the system 100 and which operates in the geographic area local or proximate to the client's 102A home address. A remote member 101B may help or facilitate the completion of a real estate transaction by a client 102A. The remote member 101B may be member that is in a location or area remote or distant from the home location of the client 102A and the operating area of the local member 101A which enabled the registration of the client 102A into the system 100.

Next, the local member 101A may provide registration information for a client 102 that the referring member 101B desires to refer to the system in step 804. The registration information may include the unique ID of the member 101, such as a phone number, a website or portal address, a mobile application download page, a QR code and the like, or any other method which may contain the ID of the member 101 and data for accessing the system 100.

In step 805, the client 102 may be registered in the system 100 and associated with the local member 101A by the communication application 323 using the ID of the member 101A provided as the client 102 accesses the system 100. In some embodiments, the client 102 may be registered by providing data describing the client 102, such as home address, phone number, email address, preferred real estate property data, preferred geographic location area data, and the like, through the user device 400 of the client 102.

Once the client 102 is registered in the system 100, in step 806, the client 102 may access real estate information on one or more real estate properties, geographic locations, and/or geographic areas using their user device 400 which may be used by the localization application 321 and/or communication application 323 to provide real estate information browsing data and location data of the client 102 to the system 100. Real estate information viewed by the client 102 may be used to form real estate information browsing data. Location data may be provided by the user device 400 of the client 102, access point 103, and/or server 300 that the user device 400 is in communication with. Preferably the location data provided by the user device 400 may comprise global positioning data and/or network based positioning data.

In step 807, the remote member 101B associated with the location area that the client 102 is currently browsing on their user device 400 may be contacted. The location are may comprise one or more real estate properties, geographic locations, and/or geographic areas. A member 101 may be associated with the location area as indicated on their registration information landing page 505 (FIG. 5). The remote member 101B may be contacted, optionally provided with an opportunity alert 632 (FIGS. 6 and 7), by email, text message, phone call, or other communication through their user device 400 by the communication application 323. In preferred embodiments, a member 101 may select one or more other members 101 which may be stored on a pre-ranked list of remote members in the real estate information database 106 and an available remote member 101B may be selected from the pre-ranked list of remote members 101B. For example, a member 101 may select a first choice remote member 101B, a second choice remote member 101B, a third choice remote member 101B, and so on, and the system 100 may work through the list when attempting to select an available remote member.

The method 800 may then proceed to decision block 808. If a first remote member 101B is available, then the method 800 may proceed to step 812. If the first remote member 101B is not available then the method 800 may proceed to step 809 in which a second remote member 101B associated with the location area may be contacted. The method 800 may then proceed to decision block 810. If the second remote member 101B is available then the method 800 may proceed to step 812 in which the second remote member 101B associated with the location area may be assigned to the client 102 as a point of contact. If the second remote member 101B is not available then the method 800 may proceed to step 811 in which the call center 150 may be assigned as the contact point for the client 102. In further embodiments, if the second remote member 101B is not available, a third remote member 101B, fourth remote member 101B, fifth remote member 101B, or any desired number of remote members 101B may be contacted. The opportunity alert application 325 may determine if the member 101 can take or accept communication with the client 102 and the presence management application 324 may confirm that the remote member 101 can accept communication with the client 102. Each geographic location may have one or more members 101 associated with it. The localization application 321 may select a member 101, optionally by round robin or any other selection method, for presence 621 determination that is associated with the geographic location that the user device 400 of the client 102 is located in or may be browsing real estate information on. In some embodiments, the presence management application 324 may determine if a member 101 is available by sending a message, such as a call or text, to the member 101, using the communication application 323, and if the member responds, the presence management application 324 may determine if a member 101 is available or has presence 621 in the system 100. In further embodiments and as illustrated in FIG. 19, the presence management application 324 may determine if a member 101 is available by receiving data from the user device 400 of a member that describes if the member 101 has selected to turn their presence 621 On or Off. For example, if the member 101 decides that they would like to be available, they may provide input to their user device 101 indicating that their presence is On and the presence management application 324 may determine that the member 101 is available or has presence 621 in the system 100. If the member 101 decides that they would not like to be available, they may provide input to their user device 101 indicating that their presence is Off and the presence management application 324 may determine that the member 101 is not available or does not have presence 621 in the system 100.

At decision block 813, the communication application 323 may determine if the client 102 requests or desires communication in regards to the location area. By receiving input from the user device 400 of the client 102 the communication application 323 may determine that the client 102 requests communication. By not receiving input from the user device 400 of the client 102 the communication application 323 may determine that the client 102 does not request communication.

If the client 102 does not request communication, the method 800 may finish 816. If the client 102 does request communication, the method 800 may proceed to step 814, and the communication application 323 may enable communication between client 102 and available remote member 101B. Preferably, the communication application 323 may enable communication between user device 400 of the client 102 and the user device 400 of the available remote member 101B. In step 815, the communication application 323 may provide client data to available remote member 101B. In other embodiments, steps 814 and 815 may be competed at the same or approximately the same time. Optionally, the communication application 323 may provide client data to the call center 150. After step 815, the method 800 may finish 816.

Figure 9:
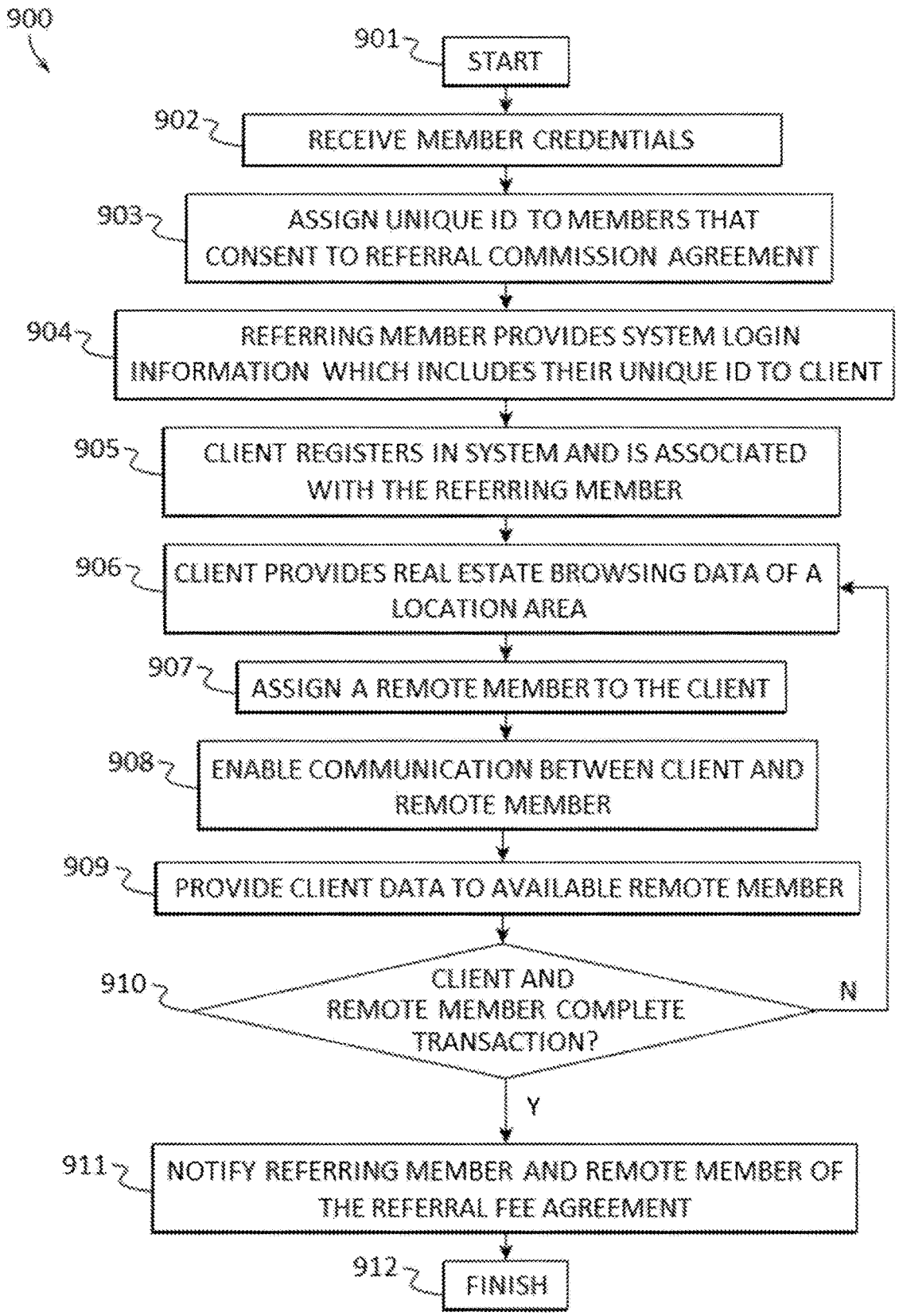
FIG. 9 shows a block diagram of an example of a referral tracking method according to various embodiments described herein.

FIG. 9 shows a block diagram of an example of a referral tracking method ("the method") 900 according to various embodiments described herein. The method 900 may be used to track referrals of one or more clients 102 to and between one or more members 101 pursuant to a referral fee agreement which may be used to split and divide referral fees between one or more members 101 and/or the administrators of the system 100. One or more steps of the method 900 may be performed by a localization application 321, incentivization application 322, a communication application 323, a presence management application 324, and/or opportunity alert application 325 which may be run on a server 300 and/or user device 400.

In some embodiments, the method 900 may start 901 and one or more member 101 credentials may be received by the communication application 323 in step 902. Member credentials may include a data describing the member 101 such as a phone number, email address, business address, home address, licensure information, membership information, preferred client and real estate property information, and the like. Member 101 credentials may be provided through the user device 400 of the member 101. In further embodiments, member 101 credentials may be provided as the member 101 registers in the system 100. In still further embodiments, the member's credentials may include the presentation of a referral fee agreement which may be used to form a contract of how referral or commission fees may be split between one or more members 101 and/or administers of the system 100. Successful registration of the member 101 may be dependent upon the member's consent to the referral fee agreement.

In step 903 a unique identifier (ID), such as an alpha numeric string, may be assigned to the member 101 that consents to referral commission agreement by the localization application 321. The unique identifier (ID) may allow the member 101 to function as a local member and a remote member. As shown by the example of FIG. 1, a local member 101A may be the member that enabled the registration of the client 102A to the system 100 and which operates in the geographic area local or proximate to the client's 102A home address. A remote member 101B may help or facilitate the completion of a real estate transaction by a client 102A. The remote member 101B may be member that is in a location or area remote or distant from the home location of the client 102A and the operating area of the local member 101A which enabled the registration of the client 102A into the system 100.

Next, the local member 101A may provide registration information to a client 102 that the local member 101A desires to refer to the system in step 904. The registration information may include the unique ID of the member 101A, such as a phone number, a website or portal address, a mobile application download page, a QR code and the like, or any other method which may contain the ID of the member 101A and data for accessing the system 100.

In step 905, the client 102A may be registered in the system 100 and associated with the local member 101A by the communication application 323 using the ID of the member 101A provided as the client 102A accesses the system 100. In some embodiments, the client 102A may be registered by providing data describing the client 102, such as home address, phone number, email address, preferred real estate property data, preferred geographic location area data, and the like, through the user device 400 of the client 102A.

Once the client 102A is registered in the system 100, in step 906, the client 102A may access real estate information on one or more real estate properties, geographic locations, and/or geographic areas using their user device 400 which may be used by the localization application 321 and/or communication application 323 to provide real estate information browsing data and location data of the client 102A to the system 100. Real estate information viewed by the client 102A may be used to form real estate information browsing data. Location data may be provided by the user device 400 of the client 102A, access point 103, and/or server 300 that the user device 400 is in communication with. Preferably the location data provided by the user device 400 may comprise global positioning data and/or network based positioning data.

In step 907, a remote member 101B associated with the location area browsed by the client 102A may be assigned to the client 102A as a point of contact. The opportunity alert application 325 may determine if the member 101 can take or accept communication with the client 102 and the presence management application 324 may confirm that the remote member 101 can accept communication with the client 102. Each geographic location may have one or more members 101 associated with it. The localization application 321 may select a member 101, optionally by round robin or any other selection method, for presence 621 determination that is associated with the geographic location that the user device 400 of the client 102 is located in or may be browsing real estate information on. The opportunity alert application 325 may determine if a member 101 is available by sending a message, such as a call or text, to the member 101, using the communication application 323, and if the member responds, the presence management application 324 may confirm that the member 101 is available or has presence 621 in the system 100 and the available remote member 101B may be assigned as a point of contact to the client 102A.

The method 900 may proceed to step 908, the communication application 323 and/or presence management application 324 may provide client data to available remote member 101B, and the communication application 323 and/or presence management application 324 may enable communication between client 102A and available remote member 101B. Preferably, the communication application 323 and/or presence management application 324 may enable communication between user device 400 of the client 102A and the user device 400 of the available remote member 101B.

In step 909, the communication application 323 may provide client data to the available remote member 101B, optionally at the same or approximately the same time as the communication application 323 may enable communication between client 102 and available remote member 101B. Preferably, the communication application 323 may enable communication between user device 400 of the client 102 and the user device 400 of the available remote member 101B.

The method 900 may then proceed to decision block 910 in which it may be determined if the client 102A and remote member 101B have completed a real estate transaction. The localization application 321 may be configured to periodically scan the real estate sales data in the zip code areas and real estate databases which are assigned to the remote member 101B and the data may be stored as commission tracking 631. The sales in an area can be matched using the remote member 101B and the client 102A information stored in the real estate database 106 (FIGS. 5-7). If the client 102A and remote member 101B do not complete a real estate transaction, the method 900 may continue to step 906.

If the client 102A and remote member 101B do complete a real estate transaction, the method 900 may continue to step 911 and the referring member 101A and remote member 101B may be notified of the referral fee agreement they consented to which may be used to govern how the referral or commission fee from the sale may be divided and split between the remote member 101B, and/or the administrators of the system 100. After step 911, the method 900 may finish 912.

Figure 10:
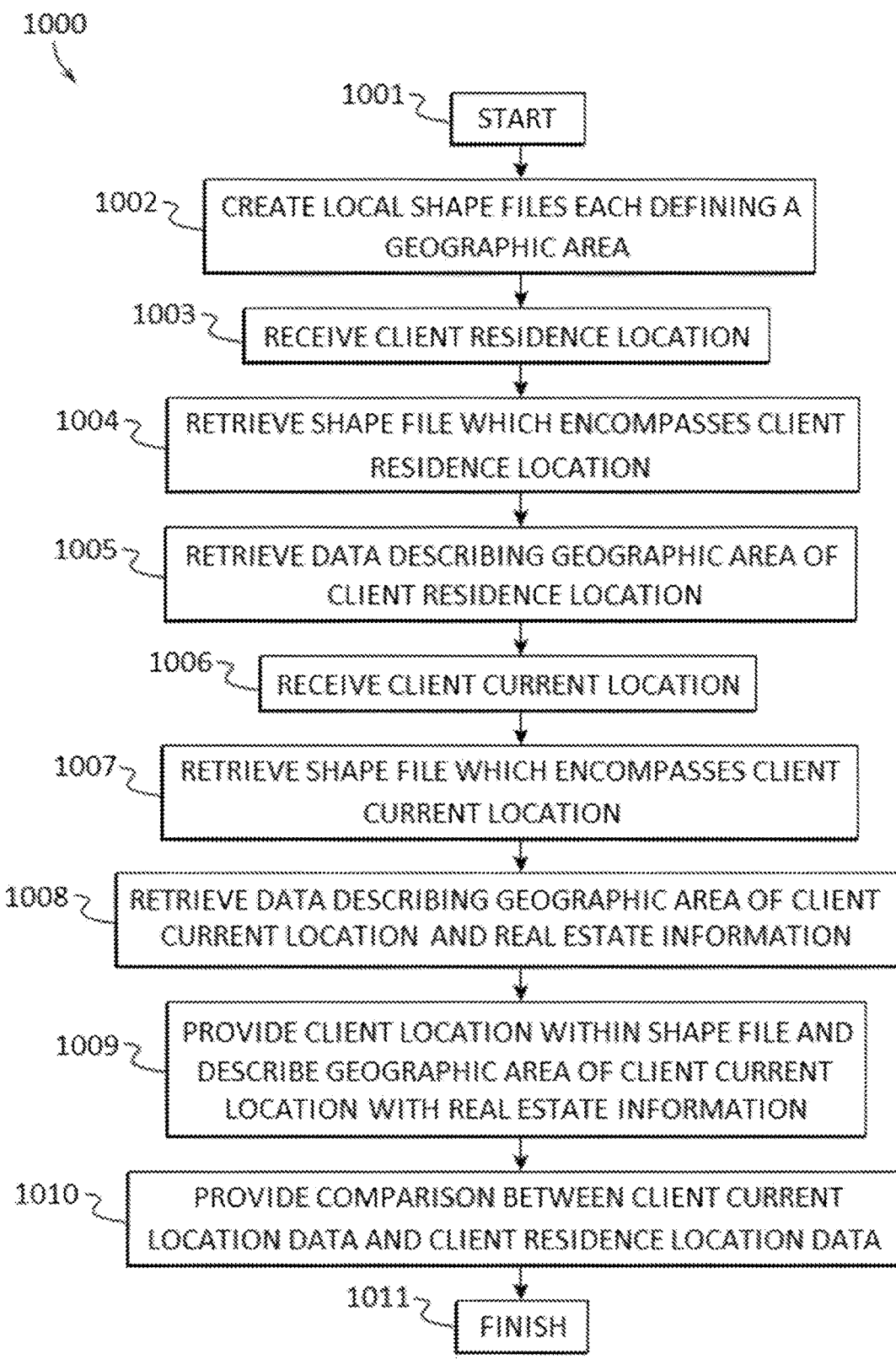
FIG. 10 depicts a block diagram of an example of a method of providing dynamic real estate information according to various embodiments described herein.

FIG. 10 depicts a block diagram of an example of a method of providing dynamic real estate information ("the method") 1000 according to various embodiments described herein. The method 1000 may be used to provide dynamic real estate information describing one or more real estate properties, geographic locations, and/or geographic areas to a user such as a client 102 or member 101 through their user device 400. In further embodiments, method 1100 may be used to provide dynamic real estate information which may include information describing a member 101 such as data on the member such as contact information, contact photos, current business address, phone number, email address, preferences on types of real estate properties, geographic locations, and/or geographic areas that the member operates in and/or desires to operate in, and/or areas or jurisdictions that the member is licensed in. One or more steps of the method 1000 may be performed by a localization application 321, incentivization application 322, a communication application 323, a presence management application 324, and/or opportunity alert application 325 which may be run on a server 300 and/or user device 400.

In some embodiments, the method 1000 may start 1001 and one or more local shapefiles each defining or representing a geographic area may be created, optionally by the localization application 321, and stored in a real estate database 106 (FIGS. 5-7) in step 1002. The geographic area may comprise or be defined by a shapefile which may include a set of latitude and longitude coordinates which may define a closed polygon's boundary. The polygon may define a geographic area delineated by a zip code, neighborhood, town, city, suburb, or any other similar boundaries.

In step 1003, the client residence location or home address may be received by the communication application 321 and optionally stored in the client records 502 of the real estate database 107. In some embodiments, the client residence location or home address of the client 102 may be received when the client 102 registered in the system 100 through the user device 400 of the client 102.

Next, the shapefile defining a geographic location which encompasses residence location of the client 102 may be retrieved from the real estate database 106 by the localization application 321 in step 1004.

In step 1005, real estate information data describing the geographic area of client residence location may be retrieved by the localization application 321 and/or communication application 323. In some embodiments, the server 300 may comprise a database of geographic areas and real estate information describing each geographic area or the communication application may retrieve the real estate data from one or more property listing databases or servers.

In step 1006, the current location of the client 102 may be received by the localization application 321. The localization application 321 may be configured to receive current location information from a user device 400 and use the location information to determine the current location of the client 102. Location information may include global positioning data, such as provided by a GPS sensor or radio I/O interface 404 of a user device 400, and/or network based positioning data, such as provided by the radio 406 of a user device 400 or by an access point 103 that the user device 400 is in communication with. In further embodiments, location information may be manually entered into a user device 400 or server 300 by a client 102.

Next, the shapefile defining a geographic location which encompasses current location of the client 102 may be retrieved from the real estate database 106 by the localization application 321 in step 1007.

In step 1008, real estate information and data describing the geographic area of client current location may be retrieved by the localization application 321 and/or communication application 323. In some embodiments, the server 300 may comprise a database of geographic areas and real estate information describing each geographic area or the communication application may retrieve the real estate information from the real estate database 106.

Next in step 1009 the current client 102 location within the shapefile may be provided with real estate information including a description of the geographic area of client's current location by the localization application 321 and the communication application 323. In some embodiments, the User device 400 display may show a map of the geographic area or local area with the client's 102 current position and a closed polygon representing the geographic area as a neighborhood or zip code area. In further embodiments, the real estate information provided to the client 102 may include information describing a member 101, such as contact information, contact photos, and the like, associated with the geographic area that the user device 400 of the client 102 is located in or proximate to. In preferred embodiments, the real estate information provided to the client 102 may include information describing a member 101, such as contact information, contact photos, and the like, associated with a real estate property which is for sale that the user device 400 of the client 102 is located in or proximate to.

Continuing to step 1010, a comparison between the client 102 current location real estate information and the real estate information of the client residence may be provided on the display of the user device 400 by the localization application 321 and/or the communication application 323. In some embodiments, the localization application 321 and the communication application 323 of the server 300 may provide real estate information to the user device 400 of the client 102 which describes a comparison between the real estate information of the geographic area the user device 400 of the client 102 is located in and the real estate information of the geographic area which encompasses the residence location of the client 102. A comparison of the real estate information may be provided and displayed on the display of the user device 400. Compared real estate information may include any data and information about the real estate properties, geographic locations, and/or geographic areas which client 102 will find useful. For example the comparison may include home prices, average home prices of the geographic areas, crime statistics, proximate businesses and services, tax information, owner history information, flood plain status, etc. Optionally, the method 1000 may continue to step 1006 or the method 1000 may finish 1011.

Figure 11:
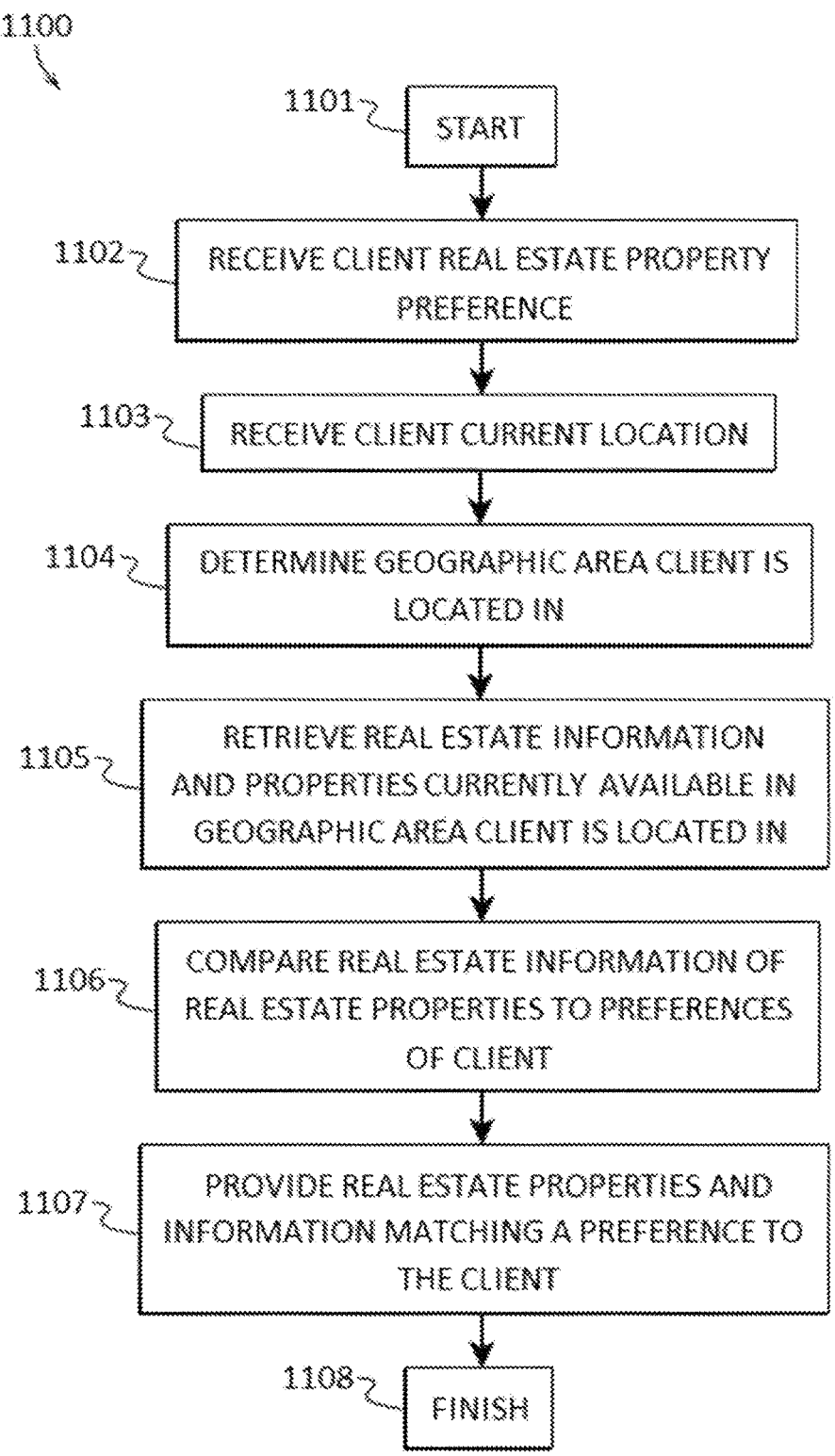
FIG. 11 illustrates a block diagram of an example of a method of providing client incentives according to various embodiments described herein.

FIG. 11 illustrates a block diagram of an example of an alternative method of providing dynamic real estate information to a client 102 ("the method") 1100 according to various embodiments described herein. The method 1100 may be used to provide dynamic real estate information, such as advertisements for available real estate properties, describing one or more real estate properties, geographic locations, and/or geographic areas which may match one or more preferences of a client 102 through their user device 400. In further embodiments, method 1100 may be used to provide dynamic real estate information which may include information describing a member 101 such as data on the member such as contact information, contact photos, current business address, phone number, email address, preferences on types of real estate properties, geographic locations, and/or geographic areas that the member operates in and/or desires to operate in, and/or areas or jurisdictions that the member is licensed in. One or more steps of the method 1000 may be performed by a localization application 321, incentivization application 322, a communication application 323, a presence management application 324, and/or opportunity alert application 325 which may be run on a server 300 and/or user device 400.

In some embodiments, the method 1100 may start 1101 and the real estate property preferences of a client 102 may be received by the communication application 323 and stored in a real estate database 106 in step 1102. Optionally, the real estate property preferences of a client 102 may be received during registration into the system 100 as information describing the client 102. Real estate property preferences may include data, such as preferences on the real estate information which may be used to describe types of real estate properties, geographic locations, and/or geographic areas that the client 102 desires live in or view. For example, real estate property preferences may include a desired property price range and square footage.

In step 1103, the current location of the client 102 may be received by the localization application 321. The localization application 321 may be configured to receive current location information from a user device 400 and use the location information to determine the current location of the client 102. Location information may include global positioning data, such as provided by a GPS sensor or radio I/O interface 404 of a user device 400, and/or network based positioning data, such as provided by the radio 406 of a user device 400 or by an access point 103 that the user device 400 is in communication with. In further embodiments, location information may be manually entered into a user device 400 or server 300 by a user 101, 102.

Next in step 1104 the geographic area client 102 is located in may be determined by the localization application 321. The localization application 321 may use location data, such as GPS coordinates (longitude and latitude) and network location data, which may be provided by the user device 400 to the localization application 321. The server 300 may comprise a real estate database 106 of geographic areas and real estate information describing each geographic area. The localization application 321 may retrieve the geographic area which includes or encompasses the location data current location of the user device 400 of the client 102.

In step 1105 the real estate information and real estate properties, with their respective real estate information, currently for sale in geographic area the client 102 is located in may be retrieved. In some embodiments, the communication application 323 may be configured to retrieve the real estate properties, and their respective real estate information, currently for sale in geographic area from the real estate database 106, one or more third party data sources such as property listing database, websites, and the like, through a network 105. For example, the communication application 323 may be configured to provide or retrieve real estate information on one or more real estate properties, geographic locations, and/or geographic areas from one or more of the property listing servers.

Next in step 1106, the real estate information and the real estate properties currently for sale may be compared to the preferences of client 102 by the localization application 321. For example, the localization application 321 may compare the square footage and price range preference data provided by the client 102 to the square footage and market price of each real estate properties currently for sale in the geographic area that the client 102 is currently in. The comparison may result in one or more real estate properties currently for sale in the geographic area with real estate information that matches one or more of the preferences of the client 102.

In step 1107 the real estate properties and real estate information which match one or more preferences provided by the client 102 may be communicated to the user device 400 of the client 102 by the communication application 323. In some embodiments, the real estate properties and their respective real estate information which match one or more preferences provided by the client 102 may be communicated to the user device 400 when the user device 400 is in a defined proximity to a matching property. In further embodiments, the real estate information provided to the client 102 may include information describing a member 101, such as contact information, contact photos, and the like, associated with the geographic area that the user device 400 of the client 102 is located in or proximate to. In preferred embodiments, the real estate information provided to the client 102 may include information describing a member 101, such as contact information, contact photos, and the like, associated with a real estate property which is for sale that the user device 400 of the client 102 is located in or proximate to. For example, as a client 102 with their user device 400 is moving through a geographic area such as a neighborhood, the user device 400 may notify the client 102 and/or display real estate information describing one or more matching properties within the area or a desired proximity to the area. In further embodiments, the real estate properties and their respective real estate information which match one or more preferences provided by the client 102 may be communicated to the user device 400 ranked by the number of preferences that the real estate property matches. Once one or more matching real estate properties have been provided, the method 1100 may finish 1108.

Figure 12:
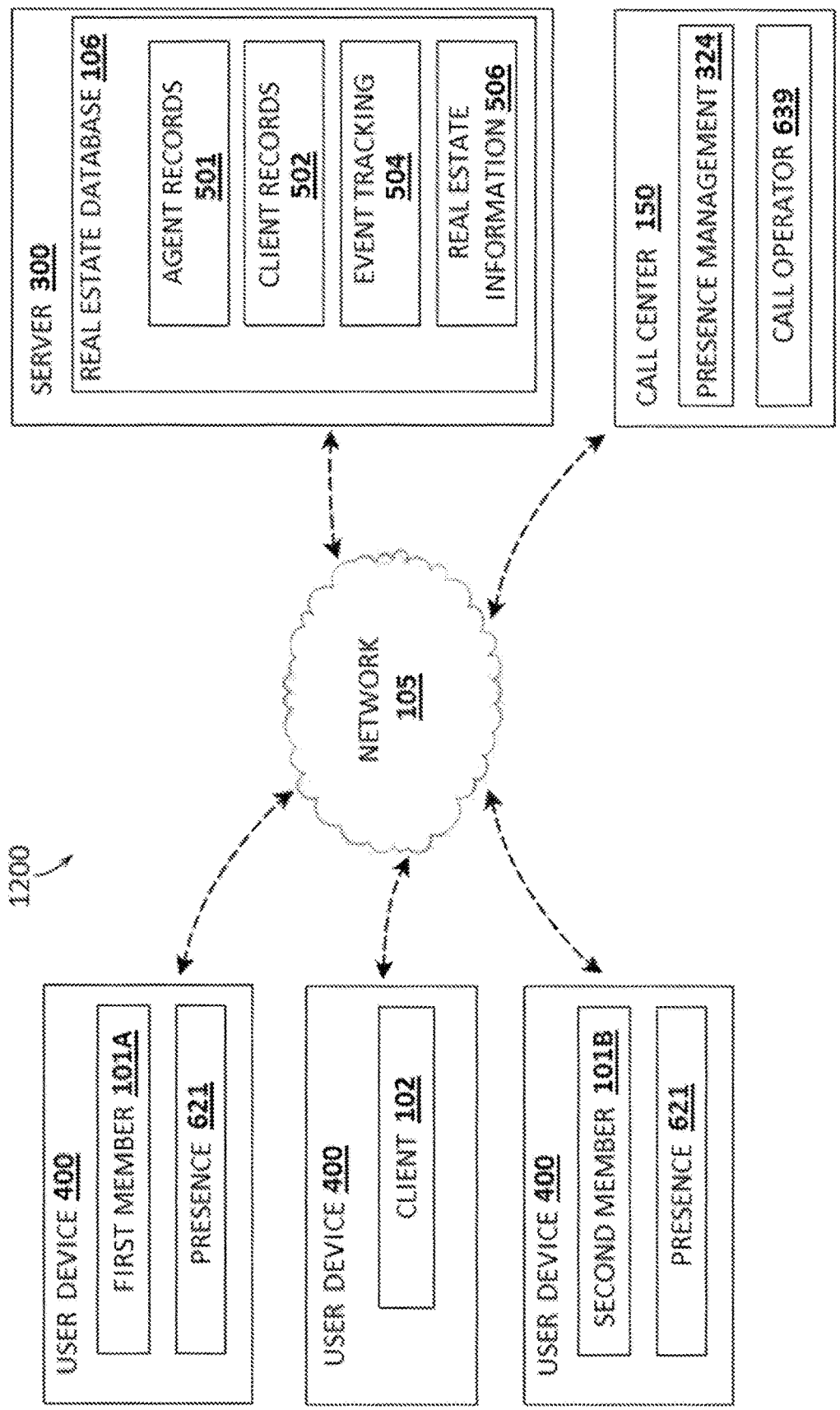
FIG. 12 shows a block diagram of an example of a method for enabling an opportunity alert notification and response thereto between a member and a client according to various embodiments described herein.

FIG. 12 shows a block diagram of an example of a method for enabling an opportunity alert notification and response thereto between a member 101 and a client 102 ("the method") 1200 according to various embodiments described herein. The method 1200 may be used to provide an opportunity alert 632 alert to the member 101 of a possible communication with a potential client 102. For example, when a client 102 requests to view real estate information 506 such as property listings from the real estate database 106. The property viewing by the client 102 may be recorded in as a property viewing event in the event tracking 504. The event also may trigger an opportunity alert application 325 which may send an opportunity alert 632 alert message to the member 101 user device 400. One or more steps of the method 1200 may be performed by a localization application 321, incentivization application 322, a communication application 323, a presence management application 324, and/or opportunity alert application 325 which may be run on a server 300 and/or user device 400.

If the client 102 is located in the geographical area assigned to the member 101, an EWS alert message will be sent to the member 101. If the member 101 accepts the request to standby or "be on call", then the member 101 may be automatically logged into the presence 621 which sends a message to the call center 150 indicating that they are standing by to receive communication from the client 102. The call center 150 may send a message to the EWS indicating that the member 101 is ready to receive communication with the client 102. This event may be logged into the event tracking 504. If the member 101 rejects the request to standby, then the EWS may select one or more other members 101 or the call center 150 to receive the communication on the behalf of the member 101.

If the client 102 is located in a geographical area not assigned to a first member 101A, then an opportunity alert 632 may be sent to a second member 101B assigned to that area, a remote member 101B. If the remote member 101B accepts the EWS request to standby or "be on call", then the remote member 101B may be automatically logged into the presence 621 which sends a message to the call center 150 indicating that they are standing by to receive communication from the client 102. The call center 150 may send a message to the EWS indicating that the remote member 101B is ready to receive communication with the client 102. This event may be logged into the event tracking 504. If the member 101B rejects the request to standby, then the EWS may select the next remote member 101B that is associated with that geographical area. This method may be repeated until a either a remote member 101B is found to be available or the list ("pool", queue) of remote members that can be assigned has been exhausted. If no remote member 101B can be found to be available, then the call center 150 may be selected to receive the communication with the client 102. After a call is completed between the client and a remote member 101B, a message may be sent to a first real estate broker 101*br*, the first member 101A, a second real estate broker 101*br*, and/or the second member 101B.

Figure 13:
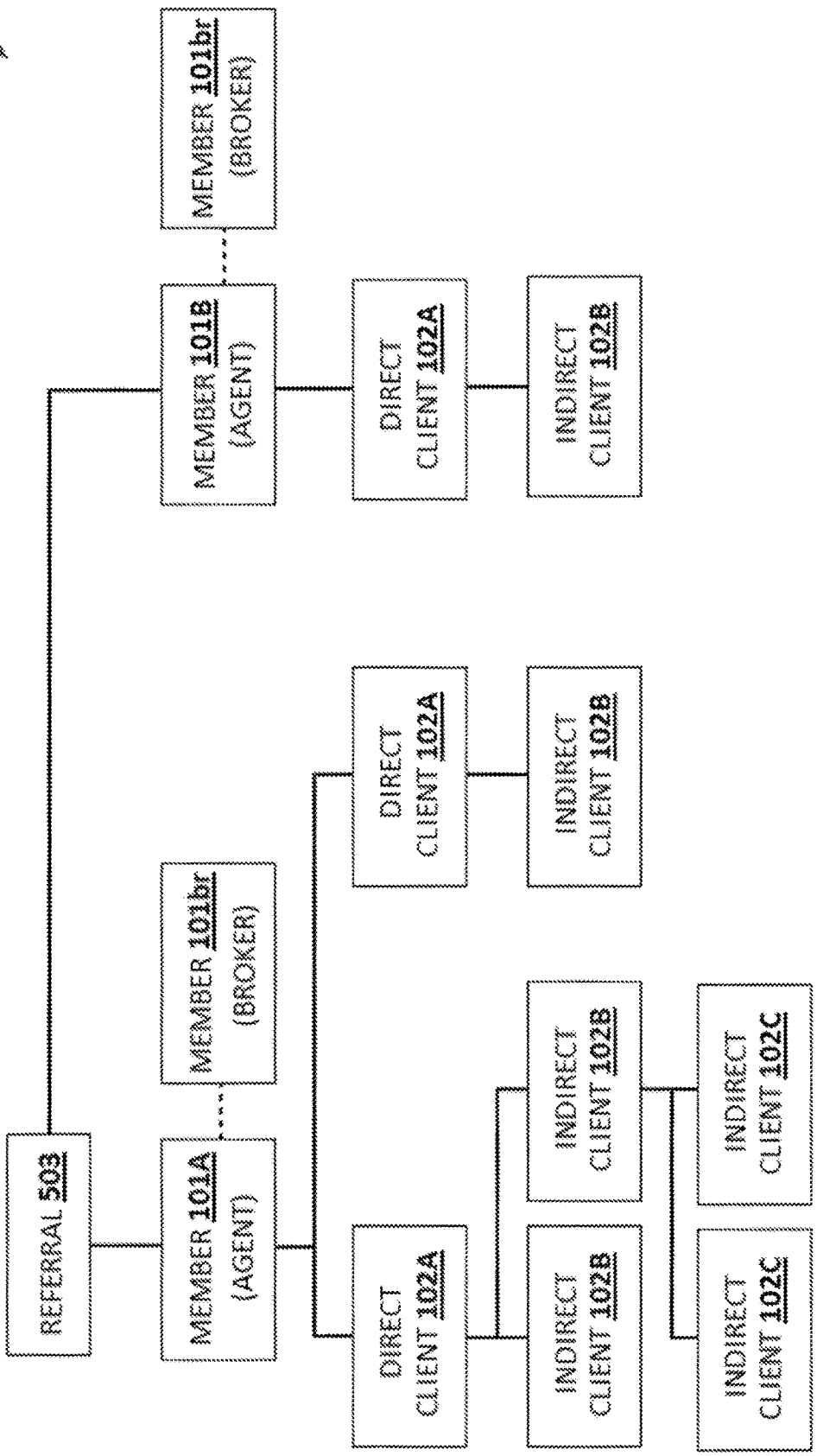
FIG. 13 depicts a block diagram of an example of a method for constructing a referral network or relationship matrix for member direct clients and indirect clients and real estate brokers according to various embodiments described herein.
Figure 17:
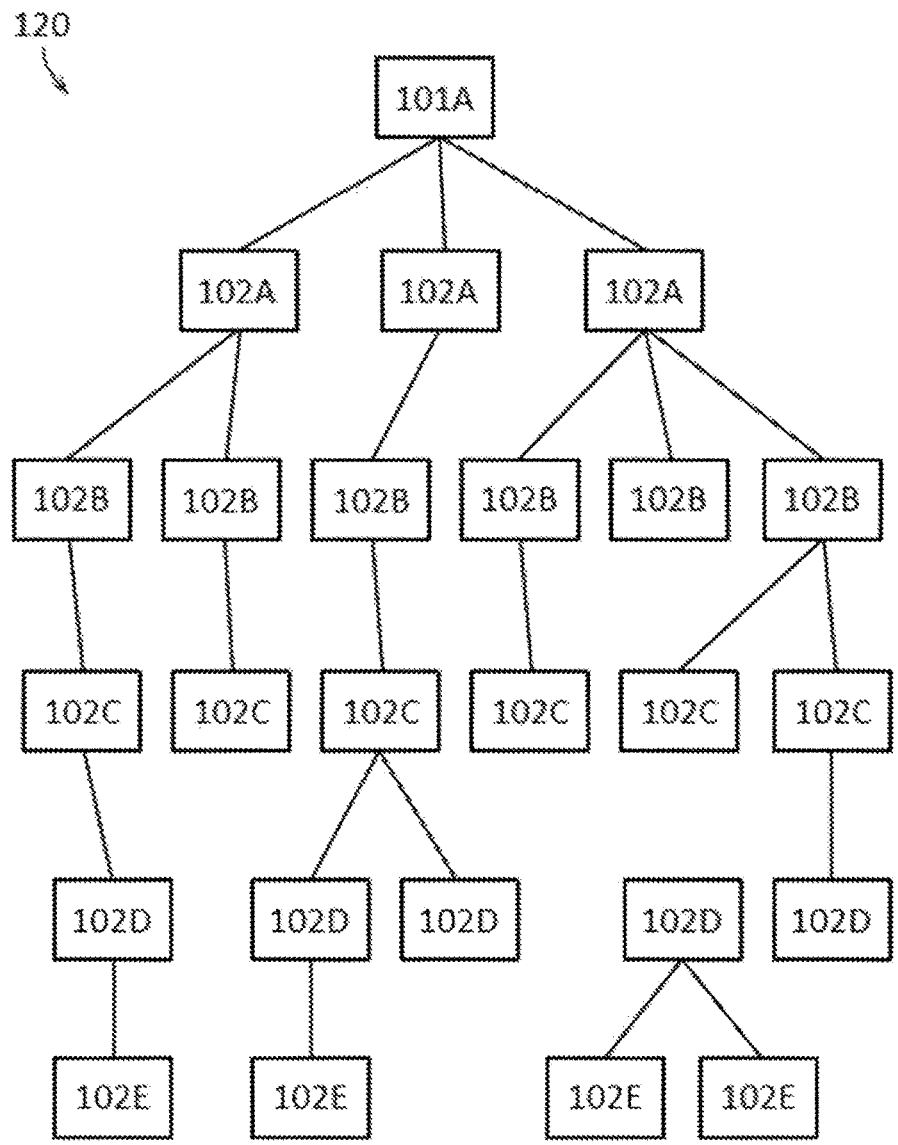
FIG. 17 illustrates a block diagram of an example of how clients and members may be linked together to create a relationship matrix linking a member and one or more clients which may be formed when clients register or enroll in the system according to various embodiments described herein.

FIG. 13 shows a block diagram of an example of a method for constructing a referral network or relationship matrix 120 as shown in FIG. 17 for members 101A, 101B, which may be real estate agents, direct clients 102A and indirect clients 102B, and members 101C, 101D, which may be real estate brokers ("the method") 1300 according to various embodiments described herein. The method 1300 may be used to construct, organize and maintain a referral network or relationship matrix 120. The real estate agent members 101A, 101B may be referred to the system 100 by a referral 503. Each real estate agent member 101A, 101B may have an associated or linked real estate broker member 101*br*. One or more steps of the method 1300 may be performed by a localization application 321, incentivization application 322, a communication application 323, a presence management application 324, and/or opportunity alert application 325 which may be run on a server 300 and/or user device 400.

A referral as indicated by the solid lines in the block diagram are generated by the referral 503 and may be initiated from a web site, social media or simple text, email or otherwise. The referral from referral 503 results in a node or "leaf" being created in the referral network or relationship matrix 120. If the referral is to a real estate agent member 101A, 101B, then the real estate broker member 101br, may be associated with the real estate agent member 101A, 101B, respectively. The real estate broker members 101br, as indicated by the dashed lines are in the referral network or relationship matrix 120 but may not receive a referral from referral 503 or any other source.

A real estate agent member 101A, 101B, may initiate a referral to non-users (individuals not enrolled in the system 100) and upon the non-user's acceptance, download of the software from the appropriate App store and login, the non-user may become a direct client 102B of real estate agent member 101A. There is no limit on the number of direct clients. A direct client 102B may initiate a referral to a non-user and upon the non-users' acceptance, download of the software from the appropriate App store and login, the non-user may become an indirect client of the real estate agent 101A. There is no limit to the number of indirect clients. An indirect client 102B may initiate a referral to a non-user and upon the non-users' acceptance, download of the software from the appropriate App store and login, the non-user may become an indirect client of the real estate agent 101A. A linkage may be established between the two indirect clients. There is no limit to the number or levels of indirect clients.

Although the referral network or relationship matrix 120 can grow to be quite large, the linked relationship between the users may always be maintained. For example, assume that at every level there are "X" referrals and the number of levels is "N", then the total number of referrals would be given by "X"" (X to the N power). Assuming X is 7 and N is 6, the number of referrals in this segment of the tree would be 117,648 for a single real estate agent. Let us assume there are 2,500 real estate agent in the referral network or relationship matrix 120, the number of referrals may grow to be 294,122,500. An alternative example would be to assume that the number of referrals for a given level decreases by one as the number of levels increase. The total number of referrals would be given by N! (i.e. N factorial) and therefore there would be 7! or 5,040 for a single real estate agent and 12,600,000 for the referral network or relationship matrix 120.

If a direct client 102 requires to be moved to a different real estate agent member 101, then the direct client 102 and all the indirect clients 102 for that direct client 102 may remain intact. There may be other ways to re-assign the direct client 102 but in all cases the referral network or relationship matrix 120 may preferably remain intact and no linkages broken.

The referral network or relationship matrix 120 may also be probed for statistical information and to detect user patterns concerning referrals. The analysis of the referral behavior may provide projections concerning possible future revenue, referral performance, marketing intelligence, etc.

Figure 14:
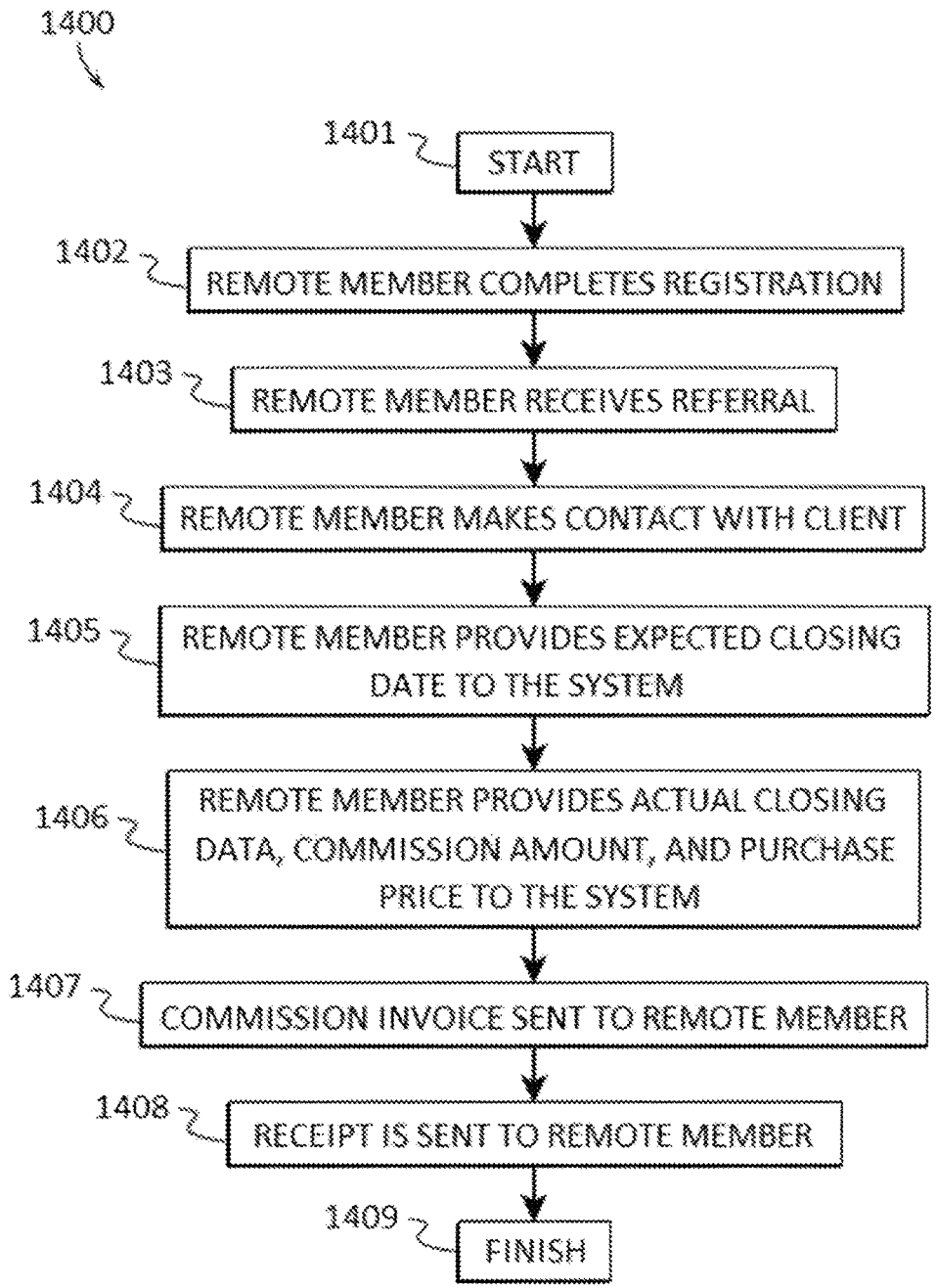
FIG. 14 illustrates a block diagram of an example of a method to determine and collect the agreed commission split amounts between members according to various embodiments described herein.

FIG. 14 illustrates a block diagram of an example of a method to determine and collect the agreed commission split amounts between members 101 ("the method") 1400 according to various embodiments described herein. The method 1400 may be used to monitor, coordinate, track, invoice and collect the referral commissions fees owed to service provider 101sp upon the closing of a real estate transaction. This example assumes that pursuant to a real estate transaction, a contract signing and closing date is set, and successful inspection takes place. Any delays of closing are not spelled out in this description. Contract is signed and a closing date is established at the time of the closing, then the member's broker hands the contract off to a closing agent, either a title representative, escrow agent or a lawyer. One or more steps of the method 1400 may be performed by a localization application 321, incentivization application 322, a communication application 323, a presence management application 324, and/or opportunity alert application 325 which may be run on a server 300 and/or user device 400.

In some embodiments, the method 1400 may start 1401 when the remote member 101 completes the registration process 1402. The initial registration process for a member 101 involves the acceptance of the service provider's 101sp referral or commission fee agreement that was agreed and signed by the member and member's licensed broker 101br. The member 101 may be assigned a unique ID for tracking referral commission fees owed and/or paid to the service provider 101sp.

In step 1403, the remote member 101 may receive an alert, such as an audible and or visual message through their user device 400, from the opportunity alert application 325 indicating that a potential client 102 user device 400 is viewing real estate information 106. Upon being alerted of the opportunity, remote member 101 accepts the opportunity and then remote member may receive the communication, such as a phone call, text or chat session, and the like, from the client 102.

In step 1404, the client 102 may request communication with the remote member 101. Based upon the remote member's availability (member must be logged in to presence management in order to receive a call by the client) and acceptance of said opportunity alert application 325 and presence management application 324 communication by the remote member 101, the client 102 is connected to the remote member 101. Once the remote member 101 and client 102 engage in communications with each other, the client 102 may be successfully registered and associated with the remote member 101 in the referral process. This referral legally falls under the commission fee agreement as initially acceptance by the remote member 101. A message may be sent to the remote member confirming acceptance and responsibility to pay referral fee. Therefore, any purchase by the client 102 of real estate property may be subject to the agreed upon commission fees.

In step 1405, the remote member 101 in accordance with the client wishes sets an expected closing date and time to sign all paperwork concerning the real estate property.

In step 1406, the remote member 101 informs service provider 101sp of the status and/or activity and the closing date, commission amount and purchase price. All this activity is logged in the event tracking 504.

In step 1407, service provider 101sp will then send the remote member an invoice which also includes the most current closing instructions.

In step 1408, service provider 101sp receives commission fee and sends a message to the remote member 101 of receipt of the commission fee. Then the method will finish 1409.

Figure 15:
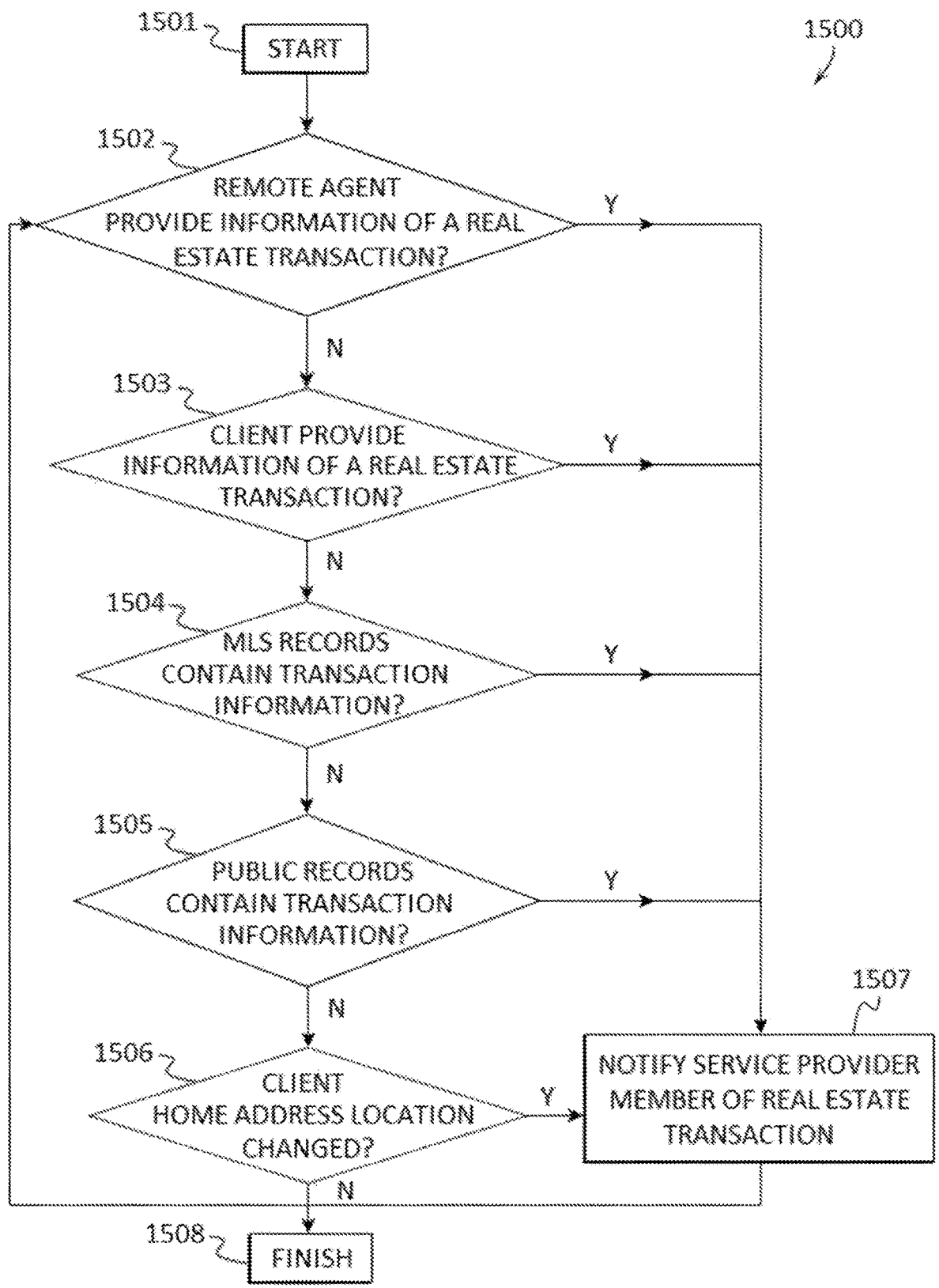
FIG. 15 shows a block diagram of an example of a method to discover real estate purchases made by a client.

FIG. 15 illustrates a block diagram of an example of a method to discover or (confirm) that a real estate transaction was closed and made by the client 102 ("the method 1500") according to various embodiments described herein. Preferably, the method 1500 may be used to ensure reporting compliance of real estate purchases and hence commission fees due the service provider member 101*sp*. The purchase discovery method 1500 may be executed multiple times on a periodic basis to determine, validate, and otherwise discover or confirm a successful real estate purchase or transaction was made by the client 102 with reference to any real estate properties viewed either before, during or after the remote member 101 contacted the client 102. Other steps may be performed by the service provider member 101*sp* to discover real estate transactions concerning members and clients. One or more steps of the method 1500 may be performed by a localization application 321, incentivization application 322, a communication application 323, a presence management application 324, and/or opportunity alert application 325 which may be run on a server 300 and/or user device 400.

In some embodiments, the method 1500 may start at 1501 when service provider member 101*sp* desires to start the discovery (confirm) method 1500 to scan for real estate property purchases made by any client 102 within the system 100.

In step 1502, the remote member 101 may inform the service provider 101*sp* that a client 102 has closed a real estate transaction and this event or discovery may be logged into the event tracking 504 and the legal audit 507. The legal audit 507 is a record of events concerning or supporting the legitimacy of the service provider's 101*sp* claim to referral fees and other compensation due the service provider 101*sp*. If this discovery occurs, then continue to 1507.

In step 1503, the client 102 may inform the service provider member 101*sp* that they have purchased real estate property from the remote member 101 and this event or discovery may be logged into the event tracking 504 and the legal audit 507. If this occurs, then continue to 1507.

In step 1504, the MLS records are scanned to determine if a property viewed by the client 102 has been "sold" or otherwise made unavailable. If a property match is found, then this event is logged in the event tracking 504 and the legal audit 507 and then continue to 1507.

In step 1505, the available public records area scanned to determine if the client 102 has purchase real estate property. If a client 102 match is discovered, then this event is logged into the event tracking 504 and the legal audit 507, and then continues to 1507.

In step 1506, client's 102 is determined by GPS that the client may have a new home address indicating they may have closed a real estate transaction with the remote member 101, and have in fact moved. If this occurs, this event is logged into the event tracking 504 and legal audit 507. This discovery indicates that a real estate purchase has likely occurred and most likely was not reported by the remote member 101.

In step 1507, the communication application 323 may create a data record in the real estate database describing the real estate transaction and a service provider member 101*sp* is notified of the real estate transaction that a real estate purchased by a client 102 has been discovered and might not have been reported by the member 101 or the client 102.

The method 1500 may be repeated periodically by the system 100 to ensure that all purchases of real estate involving the client 102 and the associated remote member 101 has been reported to service provider member 101*sp* and the method may finish 1508.

Figure 16:
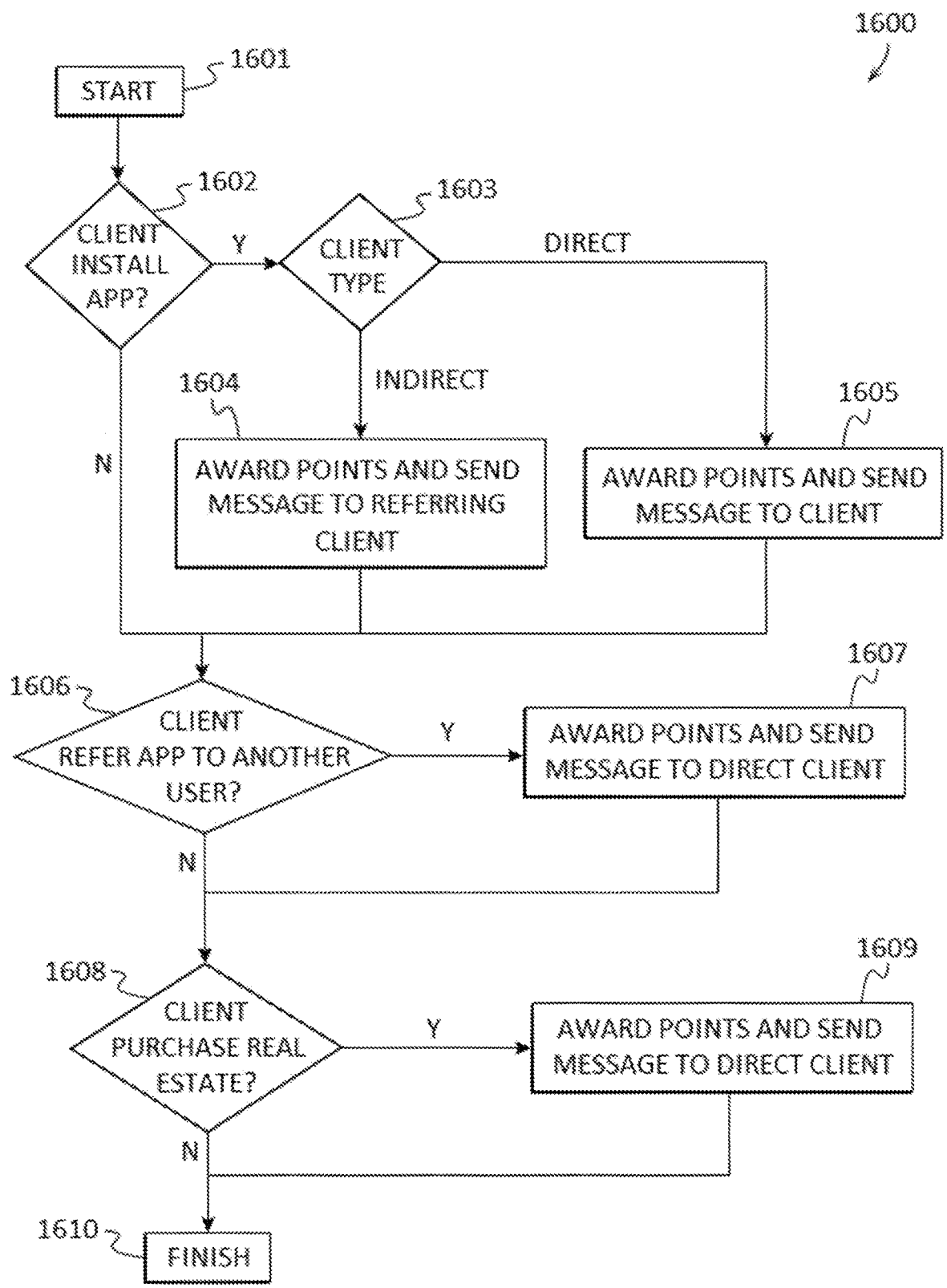
FIG. 16 depicts a block diagram of an example of a method to incentivize a client to perform certain activities within the system and receive reward points for performing those activities according to various embodiments described herein.

FIG. 16 illustrates a block diagram of an example of a method to incentivize the client 102 to perform certain activities within the system 100 and receive reward points for performing those activities ("the method") 1600 according to various embodiments described herein. The award points allocated and actions taken by the system 100 for incentivized activities may be different depending on whether the client 102 is a direct or indirect client. One or more steps of the method 1600 may be performed by a localization application 321, incentivization application 322, a communication application 323, a presence management application 324, and/or opportunity alert application 325 which may be run on a server 300 and/or user device 400.

The reward points may be redeemed for merchandise, gift cards or other available items offered within the merchant redemption center. In this and some embodiments, a direct client may refer to an existing client, sphere of influence or prospect of a member. In this and some embodiments, an indirect client may refer to a user that has been referred to the service via a direct client. An indirect client can also occur when a referral has taken place from another indirect client. In this and some embodiments, four rewards may take place or be provided: when a client uses the system 100 up for the first time; when they refer another user to the system 100; when they refer a user and a real estate transaction takes place; and when the client 102 themselves purchase a property through a member 101 of the system 100.

Referring to both FIGS. 16 and 17, in this and some embodiments, when either direct client 102A or indirect client 102B, 102C, 102D, 102E, registers with the system 100 and fills out their contact information, then the client 102A, 102B, 102C, 102D, 102E, is sent a message stating they have been rewarded. In the message there may be a link that connects the client 102A, 102B, 102C, 102D, 102E, to the system 100 redemption center where they can see the total points awarded as well as a storefront for redeeming their points. When a sale takes place the client 102A, 102B, 102C, 102D, 102E, may be sent a message stating a sale has been made and again a link that takes them to the redemption center and the same is true when they themselves close a property transaction through a member 101.

In some embodiments, the method 1600 may start at 1601 when service provider 101*sp* desires to award points for incentivize activities performed by the clients.

If the communication application 323 of the system 100 detects that a client 102 has installed the App 1602 and the client 102 is a direct client 1603, then continue to 1605. If the system 100 detects that a client has installed the App 1602 and the client is an indirect client, then continue to 1604.

In step 1604, points may be awarded to the client 102 who referred this client 102. Points are awarded to the indirect client 102 who performed this incentivized activity. Additionally, a text message or otherwise is sent to the indirect and direct client notifying them of the awarded points. In the text message is a link that connects the direct client 102 to the system 100 redemption center where they can see the total points awarded as well as a storefront for redeeming their points In step 1605, points are awarded to the direct client 102. A text message and/or other notification may be sent to the direct client. In the text message is a link that connects the direct client to the system 100 redemption center where they can see the total points awarded as well as a storefront for redeeming their points.

In step 1606, if the client 102 (direct or indirect) refers the App to another non-user 101, then points may be award to the client 1607 and text message 1607 may be sent to the client notifying them of the points awarded. In the text message is a link that connects the direct client to the system 100 redemption center where they can see the total points awarded as well as a storefront for redeeming their points.

In step 1608, if the client (direct or indirect) completed a real estate transaction, then points may be award to the client 1609 and text message 1609 may be sent to the client notifying them of the points awarded. In the text message is a link that connects the direct client to the system 100 redemption center where they can see the total points awarded as well as a storefront for redeeming their points.

Step 1610 will finish this method 1600 if there are no other points to be awarded based upon the incentivized activities herein described.

FIG. 17 illustrates a block diagram of an example of how clients and members may be linked together to create a relationship matrix linking a member and one or more clients which may be formed when clients 102 register or enroll in the system 100 according to various embodiments described herein. In some embodiments, the member 101A may register with the system 100, via their user device 400, by clicking on a link in a web page, social media post, text or email message containing a link to the member registration web page provided by the system server 300. The link may contain a unique identifier of the member 101A. The member 101A may fill out registration application including preferences which requires approval by the designated broker member 101*br* sent via a digital transaction management system. Upon electronic acceptance by broker member 101*br*, the member 101A may be sent a text or email message with a link that connects the member 101A to the system server 300. The member 101A may then access information of the system 100 via their respective user device 400. The member 101A may then cause an invitation to enroll or register with the system 100 to be sent to one or more clients 102A.

A client 102 that has received an invitation directly from a member 101A may be considered a direct client 102A. Each direct client 102A may click a link in text, email or web page or social media post, via their respective user device 400, and connects to the client registration web page on provided by the system server 300. The link may contain a unique identifier of the direct client 102A. The direct client 102A may complete registration process including providing preferences and may then access information of the system 100, via their respective user device 400, and may also be uniquely linked to the member 101A in the real estate information database 107. The direct client 102A may then cause an invitation to enroll or register with the system 100 to be sent to one or more indirect clients 102B.

A client 102 that has received an invitation from another client 102 may be considered an indirect client 102 so that the indirect clients 102 are considered indirect clients 102 of the member 101 that the client 102 who sent the invitation is themselves linked to. For example, all clients 102B, 102C, 102D, 102E, are indirect clients of member 101A, while all clients 102A are direct clients of member 101A. Each indirect client 102B may click a link in text, email or web page or social media post, via their respective user device 400, and connects to the client registration web page provided by the system server 300. The link may contain a unique identifier of the client 102B. The client 102B may then complete registration process including providing preferences and may then access information of the system 100, via their respective user device 400, and may also be uniquely linked to the client 102A that sent the invitation, and therefore also linked to the member 101A in the real estate information database 107. The indirect client 102B may then cause an invitation to enroll or register with the system 100 to be sent to one or more indirect clients 102C.

Each indirect client 102C may click a link in text, email or web page or social media post, via their respective user device 400, and connects to the client registration web page provided by the system server 300. The link may contain a unique identifier of the client 102C. The client 102C may then complete registration process including providing preferences and may then access information of the system 100, via their respective user device 400, and may also be uniquely linked to the client 102B that sent the invitation, and therefore also linked to the member 101A in the real estate information database 107. The indirect client 102C may then cause an invitation to enroll or register with the system 100 to be sent to one or more indirect clients 102D.

Each indirect client 102D may click a link in text, email or web page or social media post, via their respective user device 400, and connects to the client registration web page provided by the system server 300. The link may contain a unique identifier of the client 102D. The client 102D may then complete registration process including providing preferences and may then access information of the system 100, via their respective user device 400, and may also be uniquely linked to the client 102C that sent the invitation, and therefore also linked to the member 101A in the real estate information database 107. The indirect client 102D may then cause an invitation to enroll or register with the system 100 to be sent to one or more indirect clients 102E.

Each indirect client 102E may click a link in text, email or web page or social media post, via their respective user device 400, and connects to the client registration web page provided by the system server 300. The link may contain a unique identifier of the client 102E. The client 102E may then complete registration process including providing preferences and may then access information of the system 100, via their respective user device 400, and may also be uniquely linked to the client 102D that sent the invitation, and therefore also linked to the member 101A in the real estate information database 107. The indirect client 102E may then cause an invitation to enroll or register with the system 100 to be sent to one or more other indirect clients 102 ad infinitum.

Also referring to FIG. 17 illustrates a block diagram of an example of how clients 102A, 102B, 102C, 102D, 102E, ad infinitum may be provided an incentive by the service provider 101*sp* upon a client 102 completing an incentivized activity based upon a client's 102 linked relationship with another client 102 according to various embodiments described herein. In preferred embodiments, when an incentivized activity completed by a client 102 is received and recorded by the system 100, an incentive may be provided to the superior client 102 of the client 102 that completed the incentivized activity. For example, when an incentivized activity completed by a second client 102B is received and recorded by the system 100, an incentive may be provided to superior client 102A of second client 102B. In still further embodiments, when a real estate transaction completed by a client 102 is received and recorded by the system 100, an incentive may be provided to the superior client 102 of the client 102 that completed the incentivized activity.

Figure 18:
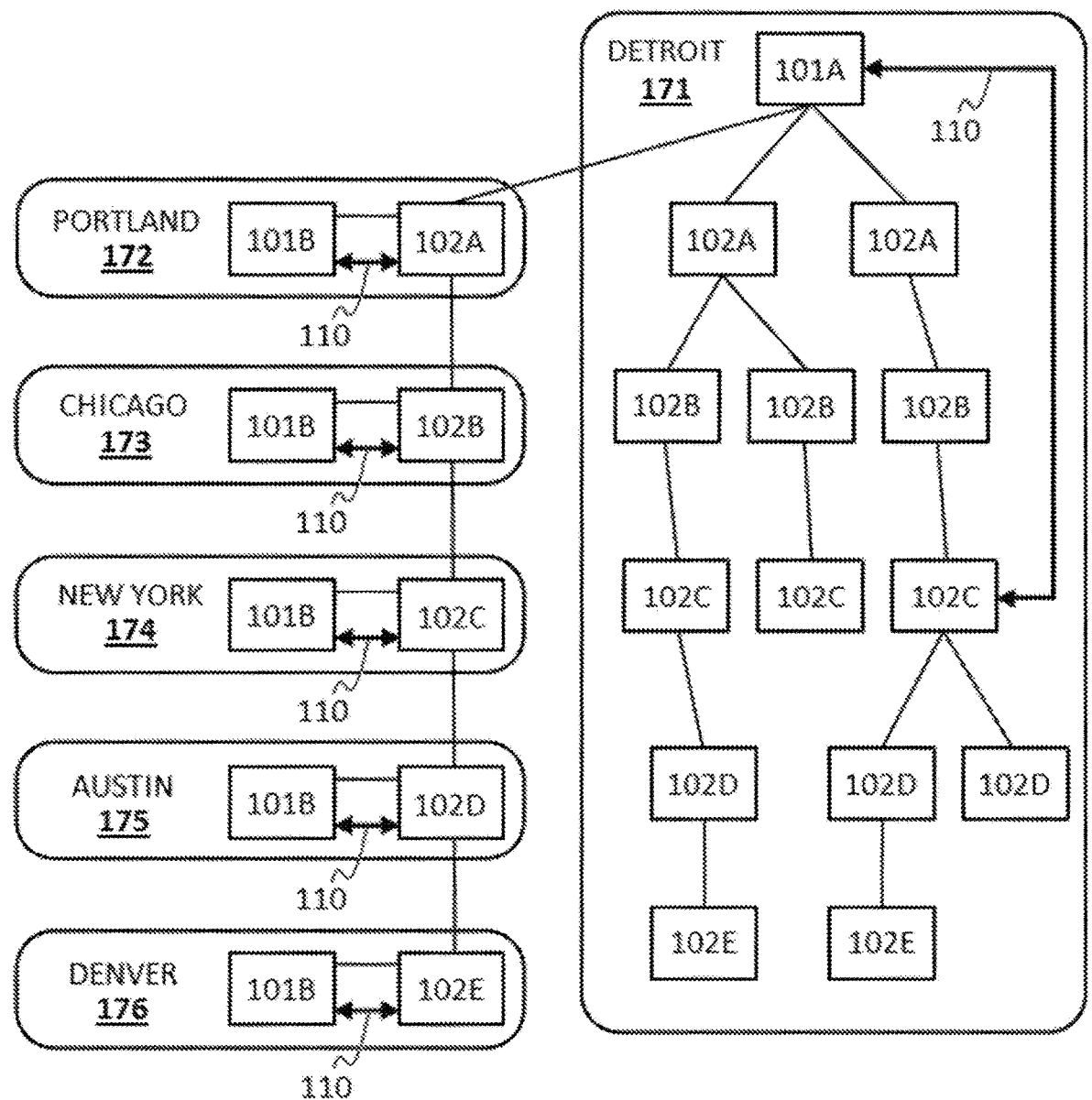
FIG. 18 shows a block diagram of an example of how clients and members may be linked together in a relationship matrix to create a linked relationship between a first member and one or more clients and second members is formed when a client and a second member communicate according to various embodiments described herein.

In some embodiments, a direct client 102A may receive incentivization for: 1) installing the application or component of the system 100 on their respective user device 400; 2) sending an invitation to an indirect client 102B; 3) when indirect client 102B (that client 102A invited) purchases real estate; and/or 4) when indirect client 102B (that client 102A invited) talks live with a remote member 101B (FIGS. 18 and 19). The incentivization application 322 may send a message to client 102A, via their respective user device 400, indicating an award or incentive has been earned. Incentivization may be provided by the incentivization application 322 for redemption via an online retailer, physical retailer, or any other method.

In some embodiments, an indirect client 102B may receive incentivization for: 1) installing the application or component of the system 100 on their respective user device 400; 2) sending an invitation to an indirect client 102C; 3) when indirect client 102C (that client 102B invited) purchases real estate; and/or 4) when indirect client 102C (that client 102B invited) talks live with a remote member 101B (FIGS. 18 and 19). The incentivization application 322 may send a message to client 102B, via their respective user device 400, indicating an award or incentive has been earned. Incentivization may be provided by the incentivization application 322 for redemption via an online retailer, physical retailer, or any other method.

In some embodiments, an indirect client 102C may receive incentivization for: 1) installing the application or component of the system 100 on their respective user device 400; 2) sending an invitation to an indirect client 102D; 3) when indirect client 102D (that client 102C invited) purchases real estate; and/or 4) when indirect client 102D (that client 102C invited) talks live with a remote member 101B (FIGS. 18 and 19). The incentivization application 322 may send a message to client 102C, via their respective user device 400, indicating an award or incentive has been earned. Incentivization may be provided by the incentivization application 322 for redemption via an online retailer, physical retailer, or any other method.

In some embodiments, an indirect client 102D may receive incentivization for: 1) installing the application or component of the system 100 on their respective user device 400; 2) sending an invitation to an indirect client 102E; 3) when indirect client 102E (that client 102D invited) purchases real estate; and/or 4) when indirect client 102E (that client 102D invited) talks live with a remote member 101B (FIGS. 18 and 19). The incentivization application 322 may send a message to client 102D, via their respective user device 400, indicating an award or incentive has been earned. Incentivization may be provided by the incentivization application 322 for redemption via an online retailer, physical retailer, or any other method.

As shown in FIG. 19, the system 100 may enable communication 110 and the transfer of information between one or more users 101, 102, which may be remote or in a different location than one or more other users 101, 102. The opportunity alert application 325 may determine if the member 101 can take or accept communication with the client 102 and the presence management application 324 may confirm that the remote member 101 can accept communication with the client 102. Each geographic location 171, 172, may have one or more members 101 associated with it. The localization application 321 may select a member 101, optionally by round robin or any other selection method, for presence 621 determination that is associated with the geographic location that the user device 400 of the client 102 is located in or may be browsing real estate information on.

Using the example of FIG. 18, a first client 102A may be local or in generally the same first geographic area 171 of Detroit, Mich. as a first member 101A so that the first client 102A and first member 101A may have developed a business relationship, such as by the first member 101A facilitated the purchase of a real estate property by the first client 102A. Since the first member 101A and first client 102A are known to each other, the first member 101A may enable the registration of the first client 102A into the system 100 and may therefore be considered as a referring member creating a first linked relationship between the first member 101A and the first client 102A in the system 100. When the first client 102A travels into a geographic area or in a different location (second geographic area 172 of Portland, Oreg.) that is a remote location, for example another state, county, zip code, or neighborhood, that is not an area that the first member 101A operates in, the system 100 may enable communication 110 and the transfer of information between the first client 102A and a second remote member 101B who operates in the second geographic area 172 of Portland, Oreg. that the first client 102A is in. If a client 102B associated with and linked to the first member 101A travels to a third geographic area 173 of Chicago, Ill., the system 100 may use location data provided by the user device 400 of the client 102B to enable communication 110 between a remote member 101B located in the third geographic area 173 of Chicago, Ill. and also this will update the record in the real estate information database 106 forming a 3-way relationship matrix between the first member 101A, client 102B, and the remote member 101B located in the third geographic area 173 of Chicago, Ill. upon the establishment of communication between the client 102B, and the remote member 101B. If a client 102C associated with the first member 101A travels to a fourth geographic area 174 of New York, N.Y., the system 100 may use location data provided by the user device 400 of the client 102B to enable communication 110 between a remote member 101C located in the fourth geographic area 174 of New York, N.Y. and also create a linked relationship in the real estate information database 106 between the first member 101A, client 102C, and that remote member 101C located in the fourth geographic area 174 of New York, N.Y. upon the establishment of communication between the client 102C, and that remote member 101C. If a client 102D associated with the first member 101A travels to a fifth geographic area 175 of Austin, Tex., the system 100 may use location data provided by the user device 400 of the client 102D to enable communication 110 between a remote member 101D located in the fifth geographic area 175 of Austin, Tex. and also create a linked relationship in the real estate information database 106 between the first member 101A, client 102D, and that remote member 101D located in the fifth geographic area 175 of Austin, Tex. upon the establishment of communication between the client 102B, and that remote member 101D. If a client 102E associated with the first member 101A travels to a sixth geographic area 176 of Denver, Colo., the system 100 may use location data provided by the user device 400 of the client 102E to enable communication 110 between a remote member 101E located in the sixth geographic area 176 of Denver, Colo. and also create a linked relationship in the real estate information database 106 between the first member 101A, client 102E, and that remote member 101E located in the sixth geographic area 176 of Denver, Colo. upon the establishment of communication between the client 102B, and that remote member 101E.

FIG. 20 illustrates an example of a relationship data table 121 which may be used to describe a relationship matrix 120 stored in a real estate information database 106 according to various embodiments described herein. The relationship data table 121 may be used and maintained by the system 100 in order to record linked relationships between any number of members 101 and clients 102. In some embodiments, the relationship data table 121 may comprise unique_ID value 122, label 123, type 124, U-link 125, and R-link 126 data fields. The unique_ID value 122 field may contain data including the ID string unique to a member 101 or client 102. The label 123 field may contain data including the name, descriptive information, contact information, licensing information, or any other data which may describe a member 101 or client 102. The type 124 field may contain data indicating that the user is a client 102 or a member 101. The U-link 125 field may contain data indicating the member 101 or client 102 that a client 102 is in a linked relationship with. The R-link 126 field may contain data indicating that a client 102 is in a linked relationship with a remote member 101B.

In this example and also referring to FIG. 18, Sally Smith is the referring member 101A for first client 102A Mary Hart as shown by the U-link 125 field for Mary Hart containing information describing or identifying first member 101A Sally Smith, such as the unique_ID value of first member 101A Sally Smith. Mary Hart is the referring client 102A for second client 102B Bill Cobb as shown by the U-link 125 field for Bill Cobb containing information describing or identifying first client 102A Mary Hart, such as the unique_ID value of first client 102A Mary Hart. Since Mary Hart is the referring client 102A for second client 102B Bill Cobb, first client 102A Mary Hart is the superior member to second client 102B Bill Cobb and second client 102B Bill Cobb is the subordinate member to first client 102A Mary Hart. Upon second client 102B Bill Cobb from the first geographic area 171 of Detroit, Ill. to the second geographic area 172 of Portland, Oreg., and the system 100 establishing communication 110 between second client 102B Bill Cobb and remote member 101B Tony Finn, the system 100 may create a linked relationship between second client 102B Bill Cobb, remote member 101B Tony Finn, first client 102A Mary Hart, and first member 101A Sally Smith by associating the unique_ID value of remote member 101B Tony Finn with second client 102B Bill Cobb in the R-link 126 field. In some embodiments, the system 100 may associate the second client 102B unique_ID value of Bill Cobb with the first member 101A unique_ID value of Sally Smith via the U-link 125 field data linking to first client 102A Mary Hart who in turn links to first client 101A Sally Smith via the U-link 125 field thereby indirectly forming a linked relationship between the first member 101A unique_ID value of Sally Smith and the second client unique_ID value of Tony Finn in the real estate information database 106.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a user device such as a personal digital assistant (PDA), laptop computer, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A system for forming a relationship matrix and establishing communication for a plurality of user devices comprising:
   a network-connected relationship matrix management computer comprising a memory and a processor and further comprising programmable instructions stored in the memory and operating on the processor, the instructions when executed by the processor, cause the processor to form a relationship matrix and establish communication for a plurality of network-connected user devices, comprising:
   a localization application;
   a communication application;
   a presence management application;
   wherein the localization application is operable to:
   assign a plurality of unique IDs to the plurality of network-connected user devices;
   store the plurality of unique IDs in the memory;
   receive a plurality of geographic device locations associated to the plurality of network-connected user devices;
   wherein a request is received, at a communication application, from a referring device, the request requesting a plurality of locations associated to information browsed by the client device wherein the referring device is a first user device of the plurality of network-connected user devices, wherein the client device is a second user device of the plurality of network-connected user devices;
   wherein the communication application requests the plurality of locations from the client device;
   wherein a browsing location is received, at the communication application, from the client device, the browsing location based on a first location associated to the information browsed by the client device;

wherein a target geographic location of one or more remote devices are identified, by the communication application, the target geographic location based on the geographic location of the one or more remote devices being the same as the first location, wherein the remote devices are at least a portion of the plurality of network-connected user devices;

wherein the presence management application analyzes one or more presence information for the one or more remote devices;

upon a first remote device of the one or more remote devices having a first presence information corresponding to available, forming the relationship matrix comprising a first unique_ID associated to the client device, a second unique_ID associated to the referring device, and a third unique_ID associated to the first remote device;

wherein upon forming the relationship matrix simultaneously establishing a communication path between the client device and the first remote device.

2. The system of claim 1, wherein each location of the plurality of geographic device locations is selected from the group consisting of global positioning data, network-based positioning data, a civic address, and a shape file.

3. The system of claim 1, wherein the target geographic location is determined by a first shape file.

4. The system of claim 3, wherein the target geographic location is determined by a comparison of a determined shape file associated with the request from the client device to a record corresponding to the first geographic area of the referring device.

5. The system of claim 1, wherein the presence management application analyzes the one or more presence information for the one or more remote devices based on a pre-ranked list of the one or more remote devices.

6. The system of claim 1, wherein the communication operability includes at least one of: a telephone call, an electronic text message, an email, a tactile response to a display screen of the client user device or the first remote device, or both.

7. The system of claim 1, wherein the communication application provides an alert to the first remote device prior to establishing a communication path between the client device and the first remote device.

8. The system of claim 7, wherein the alert is selected from the group consisting of a text message, a phone call, a notification onto a display screen of the client device, a chatbot, and a sound.

9. The system of claim 8, wherein the first location further comprises GPS coordinates associated to the client device.

10. A method for forming a relationship matrix and establishing communication for a plurality of user devices comprising the steps of:

assigning, by a localization application, a plurality of unique IDs to a plurality of network-connected user devices;

storing, by the localization application, the plurality of unique IDs in a memory, the memory associated to a network-connected relationship matrix management computer comprising the memory and a processor and further comprising programmable instructions stored in the memory and operating on the processor, the instructions when executed by the processor, cause the processor to form a relationship matrix and establish communication for the plurality of network-connected user devices;

receiving, by the localization application, a plurality of geographic device locations associated to the plurality of network-connected user devices;

receiving, at a communication application, a request from a referring device, the request requesting a plurality of locations associated to information browsed by the client device, wherein the referring device is a first user device of the plurality of network-connected user devices, wherein the client device is a second user device of the plurality of network-connected user devices;

requesting, by the communication application, the plurality of locations from the client device;

receiving, at the communication application, a browsing location from the client device, the browsing location based on the first location;

identifying, by the communication application, a target geographic location of one or more remote devices, the target geographic location based on the geographic location of the one or more remote devices being the same as the first location, wherein the remote devices are at least a portion of the plurality of network-connected user devices;

analyzing, by the presence management application, one or more presence information for the one or more remote devices;

upon a first remote device of the one or more remote devices having a first presence information corresponding to available, forming the relationship matrix comprising a first unique_ID associated to the client device, a second unique_ID associated to the referring device, and a third unique_ID associated to the first remote device;

upon forming the relationship matrix simultaneously establishing a communication path between the client device and the first remote device.

11. The method of claim 10, wherein each location of the plurality of geographic device locations is selected from the group consisting of global positioning data, network-based positioning data, a civic address, and a shape file.

12. The method of claim 10, wherein the target geographic location is determined by a first shape file.

13. The method of claim 12, further comprising the step of determining the target geographic location by comparing a determined shape file, associated with the request from the client device, to a record corresponding to the first geographic area of the referring device.

14. The method of claim 10, further comprising the step of analyzing, by the presence management application, the one or more presence information for the one or more remote devices based on a pre-ranked list of the one or more remote devices.

15. The method of claim 10, wherein the communication operability includes at least one of: a telephone call, an electronic text message, an email, a tactile response to a display screen of the client user device or the first remote device, or both.

16. The method of claim 10, further comprising the step of providing an alert, by the communication application, to the first remote device prior to establishing a communication path between the client device and the first remote device.

17. The method of claim 16, wherein the alert is selected from the group consisting of a text message, a phone call, a notification onto a display screen of the client device, a chatbot, and a sound.

18. The method of claim 17, wherein the first location further comprises GPS coordinates associated to the client device.

* * * * *